United States Patent
Akkiraju et al.

(10) Patent No.: US 9,092,824 B2
(45) Date of Patent: Jul. 28, 2015

(54) SYSTEM AND METHOD FOR FINANCIAL TRANSFORMATION

(75) Inventors: Rama K. T. Akkiraju, San Jose, CA (US); Sivaprashanth V. Danturthy, Bangalore (IN); Wei Ding, Beijing (CN); Shun Jiang, Beijing (CN); Juhnyoung Lee, Yorktown Heights, NY (US); Rakesh Mohan, Cortlandt Manor, NY (US); Carl B. Nordman, Redwood City, CA (US); Hitansh Singala, Bangalore (IN); Ponn Janaarthanan Sundhararajan, Chennai (IN); Chun Hua Tian, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 868 days.

(21) Appl. No.: 12/243,811

(22) Filed: Oct. 1, 2008

(65) Prior Publication Data

US 2010/0082407 A1    Apr. 1, 2010

(51) Int. Cl.
G06Q 10/00 (2012.01)
G06Q 40/02 (2012.01)
G06Q 10/06 (2012.01)

(52) U.S. Cl.
CPC ............... *G06Q 40/02* (2013.01); *G06Q 10/06* (2013.01); *G06Q 10/0637* (2013.01); *G06Q 10/06393* (2013.01)

(58) Field of Classification Search
USPC ................................ 705/7.11–7.42
See application file for complete search history.

(56) References Cited

U.S. PATENT DOCUMENTS

| | | | | |
|---|---|---|---|---|
| 5,737,494 A | * | 4/1998 | Guinta et al. | 706/47 |
| 5,918,232 A | * | 6/1999 | Pouschine et al. | 1/1 |
| 5,946,694 A | * | 8/1999 | Copeland et al. | 1/1 |
| 6,011,559 A | * | 1/2000 | Gangopadhyay et al. | 345/440 |
| 6,023,578 A | * | 2/2000 | Birsan et al. | 717/105 |
| 6,119,149 A | | 9/2000 | Notani | 709/205 |
| 6,161,101 A | * | 12/2000 | Guinta et al. | 706/45 |
| 6,212,530 B1 | * | 4/2001 | Kadlec | 1/1 |
| 6,292,830 B1 | * | 9/2001 | Taylor et al. | 709/224 |
| 6,332,130 B1 | * | 12/2001 | Notani et al. | 705/28 |
| 6,339,838 B1 | * | 1/2002 | Weinman, Jr. | 717/104 |
| 6,353,767 B1 | | 3/2002 | Wakeman et al. | |
| 6,411,936 B1 | * | 6/2002 | Sanders | 705/7.32 |
| 6,556,974 B1 | * | 4/2003 | D'Alessandro | 705/7.32 |

(Continued)

OTHER PUBLICATIONS

M. Ernest; J.M. Nisavic; "Adding value to the IT organization with the Component Business Model" IBM Systems Journal, vol. 46, No. 3, 2007.*

(Continued)

*Primary Examiner* — Alan S Miller
(74) *Attorney, Agent, or Firm* — Scully, Scott, Murphy & Presser, P.C.; Janice Kwon, Esq.

(57) ABSTRACT

Financial transformation in one aspect establishes a hub and spoke network of models including at least a process model as the hub and at least components model, value driver model, applications model, solutions models as the spoke connected to the process model. A plurality of correlations is inferred among said models using daisy-chain analysis that navigate the hub and spoke network of models, and heat map is generated. Heat map analysis, application shortfall analysis, organization shortfall analysis, solution analysis, and business case analysis are performed.

32 Claims, 30 Drawing Sheets

(56) References Cited

U.S. PATENT DOCUMENTS

| | | | |
|---|---|---|---|
| 6,601,233 B1* | 7/2003 | Underwood | 717/102 |
| 6,789,252 B1* | 9/2004 | Burke et al. | 717/100 |
| 6,954,758 B1* | 10/2005 | O'Flaherty | 707/802 |
| 6,965,868 B1* | 11/2005 | Bednarek | 705/7.14 |
| 7,117,161 B2 | 10/2006 | Bruce | |
| 7,162,427 B1* | 1/2007 | Myrick et al. | 705/348 |
| 7,206,751 B2* | 4/2007 | Hack et al. | 705/7.11 |
| 7,246,128 B2* | 7/2007 | Jordahl | 1/1 |
| 7,283,986 B2* | 10/2007 | Okunseinde et al. | 1/1 |
| 7,308,414 B2* | 12/2007 | Parker et al. | 705/7.27 |
| 7,503,032 B2* | 3/2009 | Bhaskaran et al. | 717/104 |
| 7,506,302 B2* | 3/2009 | Bahrami | 717/100 |
| 7,574,694 B2* | 8/2009 | Mangan et al. | 717/123 |
| 7,584,117 B2* | 9/2009 | Bubner | 705/7.36 |
| 7,617,177 B2* | 11/2009 | Bukary et al. | 1/1 |
| 7,668,855 B2* | 2/2010 | Hodgson et al. | 707/999.102 |
| 7,693,738 B2 | 4/2010 | Guinta et al. | |
| 7,933,762 B2 | 4/2011 | Pinto et al. | |
| 2001/0034628 A1* | 10/2001 | Eder | 705/7 |
| 2001/0049615 A1* | 12/2001 | Wong et al. | 705/8 |
| 2002/0099563 A1* | 7/2002 | Adendorff et al. | 705/1 |
| 2003/0004746 A1* | 1/2003 | Kheirolomoom et al. | 705/1 |
| 2003/0120372 A1 | 6/2003 | Ruth et al. | |
| 2004/0059611 A1* | 3/2004 | Kananghinis et al. | 705/7 |
| 2004/0064436 A1* | 4/2004 | Breslin et al. | 707/1 |
| 2004/0078378 A1* | 4/2004 | Bala | 707/100 |
| 2004/0078777 A1* | 4/2004 | Bahrami | 717/105 |
| 2004/0143470 A1* | 7/2004 | Myrick et al. | 705/7 |
| 2005/0055677 A1 | 3/2005 | Nanja et al. | |
| 2005/0065831 A1 | 3/2005 | Keay et al. | |
| 2005/0119922 A1* | 6/2005 | Eder | 705/7 |
| 2005/0154769 A1 | 7/2005 | Eckart et al. | |
| 2005/0171980 A1 | 8/2005 | Fernandez et al. | |
| 2005/0203784 A1* | 9/2005 | Rackham | 705/7 |
| 2005/0246215 A1* | 11/2005 | Rackham | 705/7 |
| 2006/0015424 A1* | 1/2006 | Esposito et al. | 705/35 |
| 2006/0090129 A1 | 4/2006 | Collie et al. | |
| 2006/0100947 A1 | 5/2006 | Cimral et al. | |
| 2006/0129419 A1 | 6/2006 | Flaxer et al. | |
| 2006/0178920 A1* | 8/2006 | Muell | 705/8 |
| 2006/0184412 A1 | 8/2006 | Kagan et al. | |
| 2006/0190544 A1* | 8/2006 | Chikirivao et al. | 709/206 |
| 2006/0195373 A1 | 8/2006 | Flaxer et al. | |
| 2006/0229926 A1* | 10/2006 | Homann et al. | 705/9 |
| 2006/0241956 A1* | 10/2006 | Levy et al. | 705/1 |
| 2007/0021993 A1* | 1/2007 | Chandra et al. | 705/7 |
| 2007/0022410 A1* | 1/2007 | Ban et al. | 717/136 |
| 2007/0027701 A1* | 2/2007 | Cohn et al. | 705/1 |
| 2007/0033211 A1* | 2/2007 | Berman et al. | 707/102 |
| 2007/0038465 A1* | 2/2007 | Jang et al. | 705/1 |
| 2007/0038501 A1* | 2/2007 | Lee et al. | 705/10 |
| 2007/0038502 A1 | 2/2007 | Kagan et al. | |
| 2007/0038627 A1* | 2/2007 | Cohn et al. | 707/8 |
| 2007/0050232 A1* | 3/2007 | Chang et al. | 705/10 |
| 2007/0067195 A1 | 3/2007 | Fahner et al. | |
| 2007/0106520 A1* | 5/2007 | Akkiraju et al. | 705/1 |
| 2007/0118551 A1* | 5/2007 | Akkiraju et al. | 707/102 |
| 2007/0136115 A1* | 6/2007 | Senturk Doganaksoy et al. | 705/7 |
| 2007/0162482 A1* | 7/2007 | Flaxer et al. | 707/101 |
| 2007/0174109 A1 | 7/2007 | Cohn et al. | |
| 2007/0179822 A1 | 8/2007 | Benayon et al. | |
| 2007/0179825 A1* | 8/2007 | Dreiling et al. | 705/7 |
| 2007/0203766 A1 | 8/2007 | Adler et al. | |
| 2007/0214025 A1 | 9/2007 | Jang et al. | |
| 2007/0245297 A1* | 10/2007 | Kuester et al. | 717/104 |
| 2007/0250373 A1* | 10/2007 | Ernest et al. | 705/10 |
| 2007/0265864 A1 | 11/2007 | Chess et al. | |
| 2007/0271277 A1* | 11/2007 | Ivan et al. | 707/100 |
| 2007/0279416 A1* | 12/2007 | Cobb et al. | 345/440 |
| 2008/0004924 A1 | 1/2008 | Cao et al. | |
| 2008/0033888 A1* | 2/2008 | Flaxer et al. | 705/36 R |
| 2008/0172273 A1 | 7/2008 | Rackham | |
| 2008/0177622 A1 | 7/2008 | Akkiraju et al. | |
| 2008/0313596 A1* | 12/2008 | Kreamer et al. | 717/101 |
| 2009/0006150 A1* | 1/2009 | Prigge et al. | 705/7 |

OTHER PUBLICATIONS

Juhnyoung Lee and Anca-Andreea Ivan "Value-Centric, Model-Driven Business Transformation" CEC-EEE '06 Proceedings of the 8th IEEE International Conference on E-Commerce Technology and the 3rd International Conference on Enterprise Computing, E-Commerce and E-Services, IEEE Computer Society, Washington, DC ISBN 0-7695-2511-3.*

Thomas Li, Wei Ding, Chunhua Tian, Rongzeng Cao, Shunxiang Yang, and Jun Zhu "Continual Business Transformation Technology" International Federation for Information Processing, vol. 205, Research and Practical Issues of Enterprise Information Systems, eds. Tjoa, A.M., Xu, L., Chaudhry, S., (Boston:Springer), pp. 85-95.*

Pentapalli, A Comparative Study of Roth-Erev and Modified Roth-Erev Reinforcement Learning Algorithms for Uniform-Price Double Actions, Iowa State University, 2008.

Brown et al., Treemap 97, 1997, Retrieved from http://otal.umd.edu/Olive/Class/Trees.

Cable et al., Project Portfolio Earned Value Management Using Treemaps, Project Management Institute Research Conference, Jul. 2004.

Johnson et al., Tree-Maps a Space-Filling Approach to the Visualization of Hierarchical Information Structures, IEEE CH3046-09100000284, 1991.

Jungmeister et al., Adapting Treemaps to Stock Portfolio Visualization, University of Maryland, Institute for System Research, Nov. 1992.

North et al., Snap-Together Visualization—Coordinating Multiple Views to Explore Information, HCIL Technical Report 99-10, May 1999.

Shneiderman, Discovering Business Intelligence Using Treemap Visualizations, Beyey Network, Apr. 2006.

Shneiderman, Tree Visualization with Tree-Maps—A 2-D Space-Filling Approach, University of Maryland, 1991.

Songer, Multidimensional Visualization of Project Control Data, Construction Innovation, 4, 173-190, 2004.

Office Action dated Oct. 11, 2011 received in related U.S. Appl. No. 12/243,872.

U.S. Office Action mailed Dec. 16, 2011 in related U.S. Appl. No. 12/243,898.

Merino et al., Task-at-hand interface for change detection in stock market data, ACM, 1-59593-353-0-06-005, AVI 06, Venezia, Italy, May 23-26, 2006.

Chintalapani et al., Extending the Utility of Treemaps with Flexible Hierarchy, Archives-org, 2005.

Shneiderman, Treemaps for space-constrained visualization of hierarchies, archives-org, Mar. 21, 2007.

U.S. Official Action mailed Mar. 13, 2012 in related U.S. Appl. No. 12/243,872.

Carter, E. et al., "Visual Studio Tools for Office: Using Visual Basic 2005 with Excel, Word, Outlook, and Info Path", Addison Wesley Professional, Apr. 26, 2006.

U.S. Office Action mailed Jun. 27, 2012 in related U.S. Appl. No. 12/164,582.

An Introduction to Boolean Algebra, May 30, 2007, pp. 1-3.

Microsoft Office Project Portfolio Server 2007 Dashboard User Manual, published by Microsoft Corporation 2006, pp. 1-81.

The Majority Function, Sep. 13, 2006, http://web.archive.org/web/20060913000000/http://en.wikipedia.org/wiki/Majorityfunction[Jun. 11, 2013 7:16:33 PM], pp. 1.

U.S. Office Action mailed Jun. 25, 2013 in related U.S. Appl. No. 12/243,872.

Microsoft Office Excel 2007 Visual Basic for Applications Step by Step, by Reed Jacobson, Pub. Date: May 16, 2007, Publisher: Microsoft Press, ISBN: 0-7356-2402-X, pp. 303-333.

U.S. Final Office Action dated Dec. 3, 2012 in related U.S. Appl. No. 12/164,582.

U.S. Notice of Allowance mailed Nov. 29, 2013 in related U.S. Appl. No. 12/243,872.

(56) References Cited

OTHER PUBLICATIONS

Office Action dated Jun. 23, 2011 received in related U.S. Appl. No. 12/243,898.
Office Action dated Jun. 29, 2011 received in related U.S. Appl. No. 12/243,891.
Office Action dated Jul. 19, 2011 received in related U.S. Appl. No. 12/243,851.
Microsoft Office Project Server 2007, 2006 Microsoft Corporation, http://download.microsoft.com/download/e/b/9/eb9e67aa-ae8c-4cc4-aad8-9e352f92c28c/ProjectPortfolioServer2007ProductGuide.doc.
Microsoft Office Project Portfolio Server 2007 Optimizer, https://www.am.ohio.gov/PortfolioServer/Manuals/MOPPS-Optimizer.pdf.
Balzer et al., Voroni Treemaps for the Visualization of Software Metrics, Association for Computing Machinery Inc., 2005.
Bederson et al., Ordered and Quantum Treemaps Making Effective use of 2D Space to Display Hierarchies, Institute of Advanced Computer Studies, College Park, MD, ACM, 2002.
Bladh, Step Tree, A File System Visualizer, Thesis No. MSC-2002-3, Department of Software Engineering and Computer Science, Blekinge Institute of Technology, Sweden, 2002.
Hodgson, Squarified Treemaps in XAML and C sing Microsoft Longhorne, the Code Project, 2002.
Heat Map, http://en.wikipedia.org/wiki/Heat_map, May 17, 2011.
Office Action dated May 20, 2011 received in related U.S. Appl. No. 12/243,872.

* cited by examiner

| | A | B | C | D | E | F | G | H | I | J | K | L | M | N |
|---|---|---|---|---|---|---|---|---|---|---|---|---|---|---|
| 1 | Level 2 | Level 1 | Level 2 | Level 3 | Level 4 | Level 5 | Level 6 | Level 7 | Value Type | Value Unit | Median Value | Benchmark | As Is Value | To Be Val |
| 2 | Profit | | | | | | | | | | | | | |
| 3 | | Revenue | | | | | | | | | | | | |
| 4 | | Costs | | | | | | | | | | | | |
| 5 | | | Cost of goods sold | | | | | | | | | | | |
| 6 | | | Sales, general & administration costs (SG&A) | | | | | | | | | | | |
| 7 | | | | Financial management accounting costs | | | | | | | | | | |
| 8 | | | | | Planning & management accounting cost | | | | | | | | | |
| 9 | | | | | | Planning cost | | | | | | | | |
| 10 | | | | | | | Total cost of process "perform planning/budgeting"/fo | | Less is Better | Currency ($) () | 0.53 | 0.21 | 0.53 | 0.21 |
| 11 | | | | | | | Total cost of process "perform planning/budgeting/ | | Less is Better | Currency ($) () | 1.26 | 0.49 | 1.26 | 0.49 |
| 12 | | | | | | | Total cost of process "perform planning/budgeting/ | | Less is Better | Currency ($) () | 1204.03 | 309.33 | 1204.03 | 309.33 |
| 13 | | | | | | | Total cost of process "perform planning/budgeting/ | | Less is Better | Currency ($) () | 693.33 | 42.95 | 693.33 | 42.95 |
| 14 | | | | | | Cost accounting & management cost | | | | | | | | |
| 15 | | | | | | | Total cost of the processes "perform cost accounting and | | Less is Better | Currency ($) () | 0.77 | 0.29 | 0.77 | 0.29 |
| 16 | | | | | | | Total cost of the processes "perform cost accounting and | | Less is Better | Currency ($) () | 1.41 | 0.54 | 1.41 | 0.54 |
| 17 | | | | | | | Total cost of the processes "perform cost accounting and | | Less is Better | Currency ($) () | 964.00 | 221.40 | 964.00 | 221.40 |
| 18 | | | | | | Financial performance evaluation cost | | | | | | | | |
| 19 | | | | | | | Total cost of process "evaluate and manage financial | | Less is Better | Currency ($) () | 0.49 | 0.18 | 0.49 | 0.18 |
| 20 | | | | | | | Total cost of process "evaluate and manage financial | | Less is Better | Currency ($) () | 1.03 | 0.29 | 1.03 | 0.29 |
| 21 | | | | | | | Total cost of process "evaluate and manage financial | | Less is Better | Currency ($) () | 555.64 | 17.43 | 555.64 | 17.43 |
| 22 | | | | | Revenue accounting cost | | | | | | | | | |
| 23 | | | | | | Credit management cost | | | | | | | | |
| 24 | | | | | | | Total cost of the process "process customer credit" per o | | Less is Better | Currency ($) () | 0.27 | 0.07 | 0.27 | 0.07 |
| 25 | | | | | | | Total cost of process "process customer credit" per o | | Less is Better | Currency ($) () | 0.34 | 0.09 | 0.34 | 0.09 |
| 26 | | | | | | Invoice customer cost | | | | | | | | |
| 27 | | | | | | | Total cost of the process "invoice customer" per one tho | | Less is Better | Currency ($) () | 0.48 | 0.11 | 0.48 | 0.11 |
| 28 | | | | | | | Total cost of the process "invoice customer per one tho | | Less is Better | Currency ($) () | 0.61 | 0.17 | 0.61 | 0.17 |
| 29 | | | | | | | Total cost of the process "invoice customer" per invoice p | | Less is Better | Currency ($) () | 1.91 | 0.36 | 1.91 | 0.36 |
| 30 | | | | | | | Total cost of the process "invoice customer" per invoice | | Less is Better | Currency ($) () | 0.49 | 0.09 | 0.49 | 0.09 |
| 31 | | | | | | AR cost | | | | | | | | |
| 32 | | | | | | | Total cost of the process "process accounts receivable" p | | Less is Better | Currency ($) () | 0.37 | 0.11 | 0.37 | 0.11 |
| 33 | | | | | | | Total cost of the process "process accounts receivable" p | | Less is Better | Currency ($) () | 0.56 | 0.15 | 0.56 | 0.15 |
| 34 | | | | | | | Total cost of the process "process accounts receivable" p | | Less is Better | Currency ($) () | 3.58 | 0.82 | 3.58 | 0.82 |
| 45 | | | | | | | Total cost of the process "process accounts receivable" p | | Less is Better | Currency ($) () | 1.15 | 0.37 | 1.15 | 0.37 |
| 36 | | | | | | | Total cost of the process "process accounts receivable" p | | Less is Better | Currency ($) () | 0.41 | 0.07 | 0.41 | 0.07 |
| 37 | | | | | | Collection cost | | | | | | | | |
| 38 | | | | | | | Total cost of the process "manage and process collection | | Less is Better | Currency ($) () | 0.31 | 0.10 | 0.31 | 0.10 |
| 39 | | | | | | | Total cost of the process "manage and process collection | | Less is Better | Currency ($) () | 0.26 | 0.05 | 0.26 | 0.05 |
| 40 | | | | | | | Total cost of the process "process collections" per invoices | | Less is Better | Currency ($) () | 1.71 | 0.45 | 1.71 | 0.45 |

FIG. 3

| Direct | Financial Operations | Accounting Close and Consolidation | External Financial Reporting | Business Performance Management | Planning, Budgeting, Forecasting | Risk and Compliance Management | Treasury & Investments | Tax Management | Speciality Services | Financial Administration |
|---|---|---|---|---|---|---|---|---|---|---|
| | Financial Procedures & Business Rules | Close Coordination and Scheduling | Investor Relations Management | Management Reporting Framework | Budget Procedures and Rules | Internal Controls Framework | Liquidity Planning | Tax Strategies and Planning | External Financial Audit Requirements | Financial Policies & Procedures |
| | | | | | Strategic Planning and Target Setting | | Treasury Procedures and Rules | | Internal Audit Objectives & Planning | Financial Systems Architecture Planning |
| | | Accounting Policies and Procedures | Financial Disclosure Requirements | Management Reporting Procedures & Rules | Operational Planning | Financial Procedures & Business Rules | Investment Portfolio Planning | Tax Compliance Policies and Procedures | M&A Strategy | Staff Planning |
| | | | | | | | | | | Data Governance Strategy & Rules |
| | | | | KPI Definition | Capital Planning | | Investment Procedures and Rules | | Financial Business Strategy & Corporate Structure | Finance Service Delivery Model |

FIG. 10

| Client Data | |
|---|---|
| Company | Big Thrift Bank |
| Geography | Americas |
| Industry | Financial Services |
| Project timeframe and projection | |
| Expected start - year | 2008 |
| Foercast selection | Year |
| Number of periods | 3 |
| Solution area | |
| Project description | |
| Brief description of project and scope | |
| | This is a financial services company. They have grown via mergers and acquisitions and have acquired inefficiencies in their processes via duplications. This project aims to address those inefficiencies by recommending consolidation of duplicate systems and creation of shared services for finance and accounting processes. This business case computes the potential financial benefits of such recommendations. |
| Yearly Discount Rate | 18.00% |
| Consider Terminal Value? | Yes |
| Growth Rate for TV calculation | 2.00% also in a yearly basis |
| | |
| Tool mode | Complete Version - benefit specific scenario/realization parameters |
| Each benefit will have its own realization and scenario variables in the next tab | |

FIG. 11

| | Improvement in Accounts Payable | | | | | | |
|---|---|---|---|---|---|---|---|
| | 8.8.1 Process accounts payable (AP) | | | | | | |
| Description of variables | Variable Type | AS IS case | Industry Median | Industry Benchmark | Improvement factor | TO BE case |
| Cost Measures | | | | | | |
| Total cost of the process "process accounts payable" per one thousand US Dollars revenue | Value Driver | $0.50 | $0.46 | $0.10 | | $0.10 |
| Total cost of the process "process accounts payable" per one thousand US Dollars purchases | Value Driver | $1.89 | $1.89 | $0.70 | | $0.70 |
| Personnel cost (including benefits) of the process "process accounts payable" per one thousand US Dollars revenue | Value Driver | $0.61 | $0.61 | $0.21 | | $0.21 |
| Personnel cost (including benefits) of the process "process accounts payable" per one thousand US Dollars purchases | Value Driver | $1.12 | $1.12 | $0.40 | | $0.40 |
| Personnel cost (including benefits) of the process "process accounts payable" per one thousand US Dollars cost of continuing operations | Value Driver | $0.85 | $0.85 | $0.36 | | $0.36 |
| Average personnel cost per FTE for the process "process accounts payable" | Value Driver | $40,666.67 | $40,666.67 | $23,950.96 | | $23,950.96 |
| Systems cost of the process "process accounts payable" per one hundred thousand US Dollars revenue | Value Driver | $10.64 | $10.64 | $2.52 | | $2.52 |
| Systems cost of the process "process accounts payable" per one hundred thousand US Dollars purchases | Value Driver | $20.43 | $20.43 | $4.52 | | $4.52 |
| Systems cost of the process "process accounts payable" per one hundred thousand US Dollars cost of continuing operations | Value Driver | $13.64 | $13.64 | $3.34 | | $3.34 |
| Total cost of the processes "process accounts payable" per year | Computed | $6,500,000.00 | | | | $1,300,000.00 |
| Personnel cost of the processes "process accounts payable" per year | Computed | $7,951,001.40 | | | | $2,677,082.98 |
| Systems cost of the process "process accounts payable" per year | Computed | $1,382,727.27 | | | | $327,805.23 |
| Cycle Time Measures | | | | | | |
| Cycle time in hours to enter invoice data onto the system | Value Driver | 36.00 | 36.00 | 15.00 | | 15.00 |
| Cycle time in days to resolve an invoice error | Value Driver | 5.00 | 5.00 | 2.00 | | 2.00 |
| Cycle time in days from receipt of invoice until approved and scheduled for payment | Value Driver | 10.00 | 10.00 | 4.00 | | 4.00 |
| Cycle time in days from receipt of invoice until payment is transmitted | Value Driver | 20.00 | 20.00 | 5.00 | | 5.00 |
| and Quality | | | | | | |
| Number of FTEs for the process "process accounts payable" per one billion US Dollars revenue | Value Driver | 14.75 | 14.75 | 5.43 | | 5.43 |
| Number of FTEs for the process "process accounts payable" per one billion US Dollars purchases | Value Driver | 30.57 | 30.57 | 11.75 | | 11.75 |
| Number of FTEs for the process "process accounts payable" per one billion US Dollars cost of continuing operations | Value Driver | 22.62 | 22.62 | 9.34 | | 9.34 |
| Number of invoices processed per "process accounts payable" FTE | Value Driver | 9,230.77 | 9,230.77 | 18,108.53 | | 18,108.53 |
| Number of invoice line items processed per "process accounts payable" FTE | Value Driver | 24,258.56 | 24,258.56 | 60,244.21 | | 60,244.21 |
| Number of disbursements per "process accounts payable" FTE | Value Driver | 4,056.00 | 4,056.00 | 7,155.04 | | 7,155.04 |
| Value of purchases per "process accounts payable" FTE | Value Driver | 32,483,325.35 | 32,483,325.35 | 83,763,217.92 | | 83,763,217.92 |
| Percentage of invoice line items paid on time | Value Driver | 0.94 | 0.94 | 0.99 | | 0.99 |
| | | | | | | |
| Indicate formula for total value on AS IS and TO BE CASE - same | | $6,500,000.00 | | | | $1,300,000.00 |
| Total Cash Flow impact of the benefit per period after 100% realized | | | | | | $5,200,000.00 |
| Description of the rationale behind the benefit, available benchmarks, sources of information and approach to quantification | | | | | | |

Fig. 12

| Benefit 15 | | Q1/2008 | Q2/2008 | Q3/2008 | Q4/2008 | Q1/2009 | Q2/2009 | Total Expected Benefit |
|---|---|---|---|---|---|---|---|---|
| 8.4.3 Perform Fixed Asset Accounting | | | | | | | | |
| Total benefit Value at 100% per YEAR | $343,951.95 | | | | | | | |
| Benefit value and realization schedule - base case | | 40% | 60% | 100% | 100% | 100% | 100% | |
| Benefit value and realization schedule - base case | | 34,395.2 | 51,592.8 | 85,988.0 | 85,988.0 | 85,988.0 | 85,988.0 | 429,939.9 |
| Benefit estimated value range | Conservative scenario | 25,796.4 | 38,694.6 | 64,491.0 | 64,491.0 | 64,491.0 | 64,491.0 | 322,455.0 |
| Benefit estimated value range | Aggressive scenario | 42,994.0 | 64,491.0 | 107,485.0 | 107,485.0 | 107,485.0 | 107,485.0 | 537,424.9 |
| Benefit realization per period - base case | | 0.0 | 0.0 | 0.0 | 0.0 | 0.0 | 0.0 | 0.0 |
| Benefit estimated value range | Conservative scenario | 0.0 | 0.0 | 0.0 | 0.0 | 0.0 | 0.0 | 0.0 |
| Benefit estimated value range | Aggressive scenario | 0.0 | 0.0 | 0.0 | 0.0 | 0.0 | 0.0 | 0.0 |
| Benefit Category | 8.4.3 Perform Fixed Asset Accounting | | | | | | | |
| | | Comments on the benefit | | | | | | |

| Benefit 19 | | Q1/2008 | Q2/2008 | Q3/2008 | Q4/2008 | Q1/2009 | Q2/2009 | Total Expected Benefit |
|---|---|---|---|---|---|---|---|---|
| 8.6.1 Process accounts payable (AP) | | | | | | | | |
| Total benefit Value at 100% per YEAR | $5,200,000.00 | | | | | | | |
| Benefit value and realization schedule - base case | | 0% | 60% | 100% | 100% | 100% | 100% | |
| Benefit value and realization schedule - base case | | 0.0 | 780,000.0 | 1,300,000.0 | 1,300,000.0 | 1,300,000.0 | 1,300,000.0 | 5,980,000.0 |
| Benefit estimated value range | Conservative scenario | 0.0 | 585,000.0 | 975,000.0 | 975,000.0 | 975,000.0 | 975,000.0 | 4,485,000.0 |
| Benefit estimated value range | Aggressive scenario | 0.0 | 975,000.0 | 1,625,000.0 | 1,625,000.0 | 1,625,000.0 | 1,625,000.0 | 7,475,000.0 |
| Benefit realization per period - base case | | 0.0 | 0.0 | 0.0 | 0.0 | 0.0 | 0.0 | 0.0 |
| Benefit estimated value range | Conservative scenario | 0.0 | 0.0 | 0.0 | 0.0 | 0.0 | 0.0 | 0.0 |
| Benefit estimated value range | Aggressive scenario | 0.0 | 0.0 | 0.0 | 0.0 | 0.0 | 0.0 | 0.0 |
| Benefit Category | 8.6.1 Accounts Payable | | | | | | | |
| | | Comments on the benefit | | | | | | |

| Benefit 20 | | Q1/2008 | Q2/2008 | Q3/2008 | Q4/2008 | Q1/2009 | Q2/2009 | Total Expected Benefit |
|---|---|---|---|---|---|---|---|---|
| 8.6.2 Process expense reimbursements | | | | | | | | |
| Total benefit Value at 100% per YEAR | $2,138,221.24 | | | | | | | |
| Benefit value and realization schedule - base case | | 40% | 60% | 100% | 100% | 100% | 100% | |
| Benefit value and realization schedule - base case | | 213,822.1 | 320,733.2 | 534,555.3 | 534,555.3 | 534,555.3 | 534,555.3 | 2,672,776.5 |
| Benefit estimated value range | Conservative scenario | 160,366.6 | 240,549.9 | 400,916.5 | 400,916.5 | 400,916.5 | 400,916.5 | 2,004,582.4 |
| Benefit estimated value range | Aggressive scenario | 267,277.7 | 400,916.5 | 668,194.1 | 668,194.1 | 668,194.1 | 668,194.1 | 3,340,970.7 |
| Benefit realization per period - base case | | 0.0 | 0.0 | 0.0 | 0.0 | 0.0 | 0.0 | 0.0 |
| Benefit estimated value range | Conservative scenario | 0.0 | 0.0 | 0.0 | 0.0 | 0.0 | 0.0 | 0.0 |
| Benefit estimated value range | Aggressive scenario | 0.0 | 0.0 | 0.0 | 0.0 | 0.0 | 0.0 | 0.0 |
| Benefit Category | 8.6.2 Process expense reimbursements | | | | | | | |
| | | Comments on the benefit | | | | | | |

FIG. 13

| Project Forecasted Cash Flow | | | | | | | |
|---|---|---|---|---|---|---|---|
| Description | Q1/ 2008 | Q2/ 2008 | Q3/ 2008 | Q4/ 2008 | Q1/ 2009 | Q2/ 2009 | Total |
| Benefit Details | | | | | | | |
| 8.4.3 Perform Fixed Asset Accounting | 34,395.2 | 51,592.8 | 85,988.0 | 85,988.0 | 85,988.0 | 85,988.0 | 429,939.9 |
| 8.6.1 Process accounts payable (AP) | 0.0 | 780,000.0 | 1,300,000.0 | 1,300,000.0 | 1,300,000.0 | 1,300,000.0 | 5,980,000.0 |
| 8.6.2 Process expense reimbursements | 213,822.1 | 320,733.2 | 534,555.3 | 534,555.3 | 534,555.3 | 534,555.3 | 2,672,776.5 |
| Spend Management Improvement | 0.0 | 5,700,000.0 | 5,700,000.0 | 4,560,000.0 | 5,700,000.0 | 5,700,000.0 | 27,360,000.0 |
| New Benefit | 1,500,000.0 | 2,000,000.0 | 2,500,000.0 | 4,000,000.0 | 5,000,000.0 | 5,000,000.0 | 20,000,000.0 |
| Total Benefits | 1,748,217.3 | 8,852,326.0 | 10,120,543.3 | 10,480,543.3 | 12,620,543.3 | 12,620,543.3 | 56,442,716.5 |
| Cost Details | | | | | | | |
| Services - hour based fees - Cost | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| Ongoing Costs of Service Provider | 4,000,000.0 | 4,000,000.0 | 4,000,000.0 | 0.0 | 0.0 | 0.0 | 12,000,000.0 |
| Migration Costs | 4,500,000.0 | 0.0 | 0.0 | 0.0 | 0.0 | 0.0 | 4,500,000.0 |
| Retain Internal governance of P2P process | 50,000.0 | 55,000.0 | 60,000.0 | 0.0 | 0.0 | 0.0 | 165,000.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| 0.0 | 0.0 | 0.0 | 0.0 | 0.0 | 0.0 | 0.0 | 0.0 |
| Ongoing Software Maintenance | 0.0 | 0.0 | 0.0 | 0.0 | 0.0 | 0.0 | 0.0 |
| Ongoing Hardware Maintenance | 0.0 | 0.0 | 0.0 | 0.0 | 0.0 | 0.0 | 0.0 |
| Total Project Costs | (8,550,000.0) | (4,055,000.0) | (4,060,000.0) | 0.0 | 0.0 | 0.0 | (16,665,000.0) |
| CF Totals | | | | | | | |
| Net projected cash flow from the project | (6,801,782.7) | 4,797,326.0 | 6,060,543.3 | 10,480,543.3 | 12,620,543.3 | 12,620,543.3 | 39,777,716.5 |
| Terminal value | | | | | | 85045052.33 | 85,045,052.3 |
| Project final cash flows | (6,801,782.7) | 4,797,326.0 | 6,060,543.3 | 10,480,543.3 | 12,620,543.3 | 97,665,595.6 | 124,822,768.8 |
| Metrics | | | | | | | |
| Net present Value without terminal value - NPV | 32,232,808 | | | | | | |
| Net present value considering terminal value - NPV (1) | 98,580,534 | | | | | | |
| Internal Rate of Return - IRR | 94.83% | | | | | | |
| Return on Investment - ROI | 238.69% | | | | | | |

Fig. 14

Business Case Calculator 2.0

Home | Analysis Scope | Client Data | Configuration | Benefit Modeling | Benefit Scenarios | Investments | Benefit Analysis | Executive Summary | Help

- Print Page
- Print All
- Unprotect
- Protect
- Save As

[ Clear Variables ]  [ Clear Values ]

Services - hour based fees - Yearly

| Project Phase | | |
|---|---|---|
| | | |
| | | |

Definition of level of detail on pricing

| Description of cost item | Type of cost item | | 2008 | 2009 | 2010 | Total |
|---|---|---|---|---|---|---|
| Services - hour based fees - loaded hours | Services | | | | | 0.0 |
| Services - hour based fees - Cost | Services | | | | | 0.0 |
| | | | | | | 0.0 |
| Ongoing Costs of Service Provider | Services | | $4,000,000 | $4,000,000 | $4,000,000 | $12,000,000.0 |
| Migration Costs | Software | | $4,500,000 | | | 4,500,000.0 |
| Retain Internal governance of P2P process | Retained Costs | | $50,000 | $55,000 | $60,000 | 165,000.0 |
| | | | | | | 0.0 |
| | | | | | | 0.0 |
| | | | | | | 0.0 |
| Total recommendation additional costs | | | 8,550,000.0 | 4,055,000.0 | 4,060,000.0 | 16,655,000.0 |
| Ongoing Software Maintenance | | 0% | 0.0 | 0.0 | 0.0 | 0.0 |
| Ongoing Hardware Maintenance | | 15% | 0.0 | 0.0 | 0.0 | 0.0 |
| | | | | | | |
| Expected Costs | | | 8,550,000.0 | 4,055,000.0 | 4,060,000.0 | 16,665,000.0 |
| Aggressive Costs (Low Estimate) | | 90% | 7,695,000.0 | 3,649,500.0 | 3,654,000.0 | 14,998,500.0 |
| Conservative Costs (High Estimate) | | 110% | 9,405,000.0 | 4,460,500.0 | 4,466,000.0 | 18,331,500.0 |

FIG. 20

Business Case Calculator 2.0

Home | Analysis Scope | Client Data | Configuration | Benefit Modeling | Benefit Scenarios | Investments | Benefit Analysis | Executive Summary | Help

- Print Page
- Print All
- Unprotect
- Protect
- Save As

[Clear Variables]  [Clear Values]

| Description | 2008 | | | | |
|---|---|---|---|---|---|
| Benefit Details | | | | | |
| 8.4.3 Perform Fixed Asset Accounting | 137,580.9 | 206,371.2 | 343,952.0 | | 687,903.9 |
| 8.6.1 Process accounts payable (AP) | 0.0 | 4,056,000.0 | 6,760,000.0 | | 10,816,000.0 |
| 8.6.2 Process expense reimbursements | 477,033.5 | 715,550.2 | 1,192,583.7 | | 2,385,167.5 |
| Spend Management Improvement | 0.0 | 22,800,000.0 | 22,800,000.0 | | 46,600,000.0 |
| Total Benefits | 614,614.3 | 27,777,921.4 | 31,096,535.7 | | 59,489,071.4 |
| Cost Details | | | | | |
| Services - hour based fees - Cost | 0.0 | 0.0 | 0.0 | | 0.0 |
| 0.0 | 0.0 | 0.0 | 0.0 | | 0.0 |
| 0.0 | 0.0 | 0.0 | 0.0 | | 0.0 |
| Ongoing Costs of Service Provider | 4,000,000.0 | 4,000,000.0 | 4,000,000.0 | | 4,000,000.0 |
| Migration Costs | 4,500,000.0 | 0.0 | 0.0 | | 4,500,000.0 |
| Retain Internal governance of P2P process | 50,000.0 | 55,000.0 | 60,000.0 | | 165,000.0 |
| 0.0 | 0.0 | 0.0 | 0.0 | | 0.0 |
| 0.0 | 0.0 | 0.0 | 0.0 | | 0.0 |
| 0.0 | 0.0 | 0.0 | 0.0 | | 0.0 |
| Ongoing Software Maintenance | 0.0 | 0.0 | 0.0 | | 0.0 |
| Ongoin Hardware Maintenance | 0.0 | 0.0 | 0.0 | | 0.0 |
| Total Project Cost | (8,550,000.0) | (4,055,000.0) | (4,060,000.0) | | (16,665,000.0) |
| CF Totals | | | | | |
| Net projected cash flow from the project | (7,935,000.0) | 23,722,921.4 | 27,036,535.7 | | 42,824,071.4 |
| Terminal value | | | | 172357915 | 172,357,915.0 |
| Project final cash flows | (7935,385.7) | 23,722,921.4 | 199,394,450.7 | | 215,181,986.4 |
| Metrics | | | | | |
| Net present value without terminal value - NPV | 26,767,800 | | | | |
| Net present value considering terminal value - NPV (1) | 131,670,148 | | | | |
| Internal Rate of Return - IRR | 286.99% | | | | |
| Return on Investment - ROI | 256.97% | | | | |

FIG. 21

SYSTEM AND METHOD FOR FINANCIAL TRANSFORMATION

CROSS-REFERENCE TO RELATED APPLICATIONS

This application is related to U.S. patent application Ser. No. 12/243,851 entitled, "SYSTEM AND METHOD FOR INFERRING AND VISUALIZING CORRELATIONS OF DIFFERENT BUSINESS ASPECTS FOR BUSINESS TRANSFORMATION," U.S. patent application Ser. No. 12/243,872 entitled, "SYSTEM AND METHOD FOR DETERMINING TEMPERATURE OF BUSINESS COMPONENTS FOR FINDING BUSINESS TRANSFORMATION OPPORTUNITIES," U.S. patent application Ser. No. 12/243,891 entitled, "SYSTEM AND METHOD FOR FINDING BUSINESS TRANSFORMATION OPPORTUNITIES BY ANALYZING SERIES OF HEAT MAPS BY DIMENSION," U.S. patent application Ser. No. 12/243,898 entitled, "SYSTEM AND METHOD FOR FINDING BUSINESS TRANSFORMATION OPPORTUNITIES BY USING A MULTI-DIMENSIONAL SHORTFALL ANALYSIS OF AN ENTERPRISE," filed on even date and assigned to the same assignee in the present application, contents of which are incorporated by reference herein in their entirety. This application is also related to U.S. patent application Ser. No. 12/164,582 entitled, "SYSTEM AND METHOD FOR PLATFORM-INDEPENDENT, SCRIPT-BASED APPLICATION GENERATION FOR SPREADSHEET SOFTWARE," filed on Jun. 30, 2008 and assigned to the same assignee of the present application, contents of which are incorporated by reference herein in its entirety.

FIELD OF THE INVENTION

The present disclosure relates generally to computer applications, and more particularly to financial transformation.

BACKGROUND OF THE INVENTION

Business transformation is a key management initiative that attempts to align people, process and technology of an enterprise closely with its business strategy and vision. Business transformation is often achieved by taking a holistic look at various dimensions of an enterprise such as business models, management practices, business processes, organizational structure and technology and optimizing them with best-practice or differentiated methods to reach a strategic end state. For example, business transformation in the enterprise finance area would, among others, optimize financial processes such as accounts receivables, eliminate non-value-added tasks, improve efficiency and productivity of people, and reduce errors by using technologies. Business transformation is considered an essential part of the competitive business cycle.

Consulting service companies in the business transformation area brand technology and consulting as their core product and service offerings. These offerings include models, methods and tools devised for facilitating business transformation. While the state-of-the-art business transformation consulting models and methods are useful, there are a number of general problems that need to be addressed to make them more effective. First, the current approaches are often limited in scalability because they demand subject matter experts to work with a variety of disconnected data, tools, templates and other assets. It is often cumbersome and difficult to streamline the data gathering and management manually. Data and documents often reside in multiple folders distributed among several machines. Consistency checking across data can only be done manually, and the process requires experts. It is not easy to capture a structured thinking process without a tool, which enforces the process or method. Information and knowledge not captured systematically is often difficult to disseminate and reuse effectively. Assets such as knowledge, models and methods are not necessarily managed. For example, more often than not, there is no version control put in place, and updating the assets consistently across the board becomes a daunting task. Multiple views with scattered documents having multiple views such as a process view, metrics view, component view, resource view, etc. are difficult to visualize. This in turn makes it difficult to link up upstream and downstream analysis.

Business transformation is related to earlier efforts and studies in Business Process Reengineering, Business Process Redesign, Business Process Change Management, Business Process Management, and Enterprise Architecture. Business process reengineering (BPR) is a management approach aiming at improvements by means of elevating efficiency and effectiveness of the processes that exist within and across organizations. In BPR, organizations look at their business processes from an unbiased perspective and determine how they can best construct these processes to improve how they conduct business. In 1990s, process reengineering was adopted at an accelerating pace. The early BPR methodologies were rooted in IT-centric BPR solutions. One such model, Process Reengineering Life Cycle approach outlines an iterative application of the following steps: (1) envision new processes, (2) initiating change, (3) process diagnosis, (4) process redesign, (5) reconstruction, and (6) process monitoring. While useful in specific cases, the methodologies did not address issue of scalable applications from the practitioner's viewpoint. There are few tools or information technology that comprehensively facilitates the BPR methodology, and users are left with primitive means for practicing the methodology.

Business Process Management (BPM) is an emerging field of knowledge and research at the intersection between management and information technology, encompassing methods, techniques and tools to design, enact, control, and analyze operational business processes involving humans, organizations, applications, documents and other sources of information. BPM differs from BPR in that it does not aim at one-off revolutionary changes to business processes, but at their continuous evolution. In addition, BPM usually combines management methods with information technology to make business transformation activities faster and cheaper. BPM systems monitor the execution of the business processes so that managers can analyze and change processes in response to data, rather than just a hunch. BPM allows the organizations to manage their processes as any other assets and improve and manage them over the period of time. The activities, which constitute BPM life cycle can be grouped into five categories: Process Design, Process Modeling, Process Execution, Process Monitoring, and Process Optimization.

Another related concept is Enterprise Architecture, which is the description of the current and future structure and behavior of an organization's processes, information systems, personnel and organizational sub-units, aligned with the organization's core goals and strategic direction. Although often associated strictly with information technology, it relates more broadly to the practice of business optimization in that it addresses business architecture, performance management, organizational structure and process architecture as well. The primary purpose of creating enterprise architecture is to ensure that business strategy and IT investments are aligned. As such, enterprise architecture allows traceability from the business strategy down to the underlying technology. The practice of enterprise architecture involves developing an architecture framework to describe a series of "current", "intermediate" and "target" reference architectures and applying them to align change within the enterprise. These frameworks detail all relevant structure within the organization including business, applications, technology and data. Each framework will provide a rigorous taxonomy and ontology that clearly identifies what processes a business performs and detailed information about how those processes are executed. While enterprise architecture is a key component of the information technology governance process at any organization of significant size, it also ideally relates broadly to the practice of business process management and optimization, because it addresses business architecture, performance management and process architecture as well.

U.S. Patent Publication 2005/0246215A1 discloses a system and method for alignment of an enterprise to component business model (CBM). This patent publication discloses creating a component business model of the enterprise in its current state and a component business model of a desired state, then comparing the two to identify the areas of improvement and change. The differences identified between the two are prioritized for alignment with business objectives.

U.S. Patent Publication 2007/0027701 discloses a system and method for using component business model to organize an enterprise. This patent publication discloses how a component business model can be used to organize an enterprise. It describes identifying non-overlapping components of a business and then distinguishing them based on whether each component helps differentiate the business in the marketplace or if it provided standardized functions. One can analyze the attributes of each component and mark components as 'hot', meaning they might need to be optimized to align to the business objectives.

U.S. Patent Publication 2007/0174109 discloses a system and method for transforming an enterprise using a component business model. This patent publication describes a system and a method of using a CBM map for transforming an enterprise. Specifically, it discloses that industry standard CBM maps can be prepared ahead of time for each industry and that these can be retrieved from a repository and customized for each client's need. Components in a CBM can be rearranged based on the transformation strategy chosen. Special views can be enabled on a CBM map to query and focus on specific components related to a specific capability.

U.S. Patent Publication 2008/0033888 discloses a method and system for enterprise portfolio management based on component business model. This patent publication describes managing a portfolio of enterprise IT applications based on component business model. The idea is to help select a suitable set of IT transformation projects from among a larger set of IT transformation projects by conducting value analysis. This value analysis keeps the existing IT infrastructure of the client into account.

The above described patent publications, however, do not disclose or suggest identification of business transformation initiatives automatically, conducting a business case analysis of the transformation initiatives identified via component business modeling analysis, for instance, including return on investment (ROI) calculation, net present value (NPV) calculation, break-even analysis, internal rate of return (IRR), etc. Those publications also do not disclose or suggest, pre-populating the tool with various industry specific content (such as metrics, costs of transformations etc) based on past history, or providing what-if scenario analysis for evaluating several transformation initiatives, thereby facilitating the selection of best suited set of transformations from a portfolio of transformation choices possible. They also do not disclose or suggest automation of health measurement of each component by comparing the metrics associated with a component with those of industry benchmarks.

BRIEF SUMMARY OF THE INVENTION

A method and system for financial transformation are provided. The method in one aspect may comprise, establishing a hub and spoke network of models including at least a process model as the hub and at least components model, value driver model, applications model, solutions models as the spoke connected to the process model. The method may also comprise inferring a plurality of correlations among said models using daisy-chain analysis that navigates the hub and spoke network of models; generating heat map and performing analysis on the heat map; performing application short fall analysis, the shortfall analysis including at least selecting application, overlaying application, and identifying application shortfall; performing organization shortfall analysis, the organization shortfall analysis including at least selecting organization unit, overlaying organization unit, and identifying organization shortfall; performing solution analysis, the solution analysis including at least reviewing shortfall, selecting solution and analyzing solution; and performing business case analysis, the business case analysis including at least a combination of CBM analysis and business case analysis, and benchmarking data-based business case analysis with financial metrics.

A method for financial transformation, in another aspect, may comprise establishing a hub and spoke network of models including at least a process model as the hub and at least components model, value drivers model, applications model, solutions models as the spoke connected to the process model; providing a model mapper editor to allow mapping of a plurality of components of said models; providing a computer-implemented module that infers a plurality of correlations among said models using daisy-chain analysis that navigates the hub and spoke network of models; providing a computer-implemented module that generates heat map and perform analysis on the heat map; providing a computer-implemented module that performs application short fall analysis, the shortfall analysis including at least selecting application, overlaying application, and identifying application shortfall; providing a computer-implemented module that performs organization shortfall analysis, the organization shortfall analysis including at least selecting organization unit, overlaying organization unit, and identifying organization shortfall; providing a computer-implemented module that performs solution analysis, the solution analysis including at least reviewing shortfall, selecting solution and analyzing solution; and providing a computer-implemented module that performs business case analysis, the business case analysis including at least a combination of CBM analysis and business case analysis, and benchmarking data-based business case analysis with financial metrics.

A system for financial transformation, in one aspect, may comprise one or more processors; a module that establishes a hub and spoke network of models including at least a process model as the hub and at least components model, value drivers model, applications model, solutions models as the spoke connected to the process model; a model mapper editor to allow mapping of a plurality of components of said models; a module that infers a plurality of correlations among said models using daisy-chain analysis that navigates the hub and spoke network of models; a module that generates heat map and perform analysis on the heat map; a module that performs application short fall analysis, the shortfall analysis including at least selecting application, overlaying application, and identifying application shortfall; a module that performs organization shortfall analysis, the organization shortfall analysis including at least selecting organization unit, overlaying organization unit, and identifying organization shortfall; a module that performs solution analysis, the solution analysis including at least reviewing shortfall, selecting solution and analyzing solution; and a module that performs business case analysis, the business case analysis including at least a combination of CBM analysis and business case analysis, and benchmarking data-based business case analysis with financial metrics.

A program storage device readable by a machine, tangibly embodying a program of instructions executable by the machine to perform above describes methods of financial transformation may also be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 is an example of a model template provided in the present disclosure in one embodiment.

FIG. 10 illustrates heat map exported to a presentation file.

FIG. 11 illustrates a snapshot of a business case calculator in one embodiment of the present disclosure.

FIG. 12 illustrates a snapshot of a benefit calculation worksheet in one embodiment of the present disclosure.

FIG. 13 illustrates a snapshot of a benefits realization schedule in one embodiment of the present disclosure.

FIG. 14 illustrates financial analysis result in one embodiment of the present disclosure.

FIG. 20 illustrates a cost model for the improved procure-to-pay function in one embodiment of the present disclosure.

FIG. 21 illustrates cash flow forecast and NPV analysis of the procure-to-pay function in one embodiment of the present disclosure.

DETAILED DESCRIPTION

Figure 1:
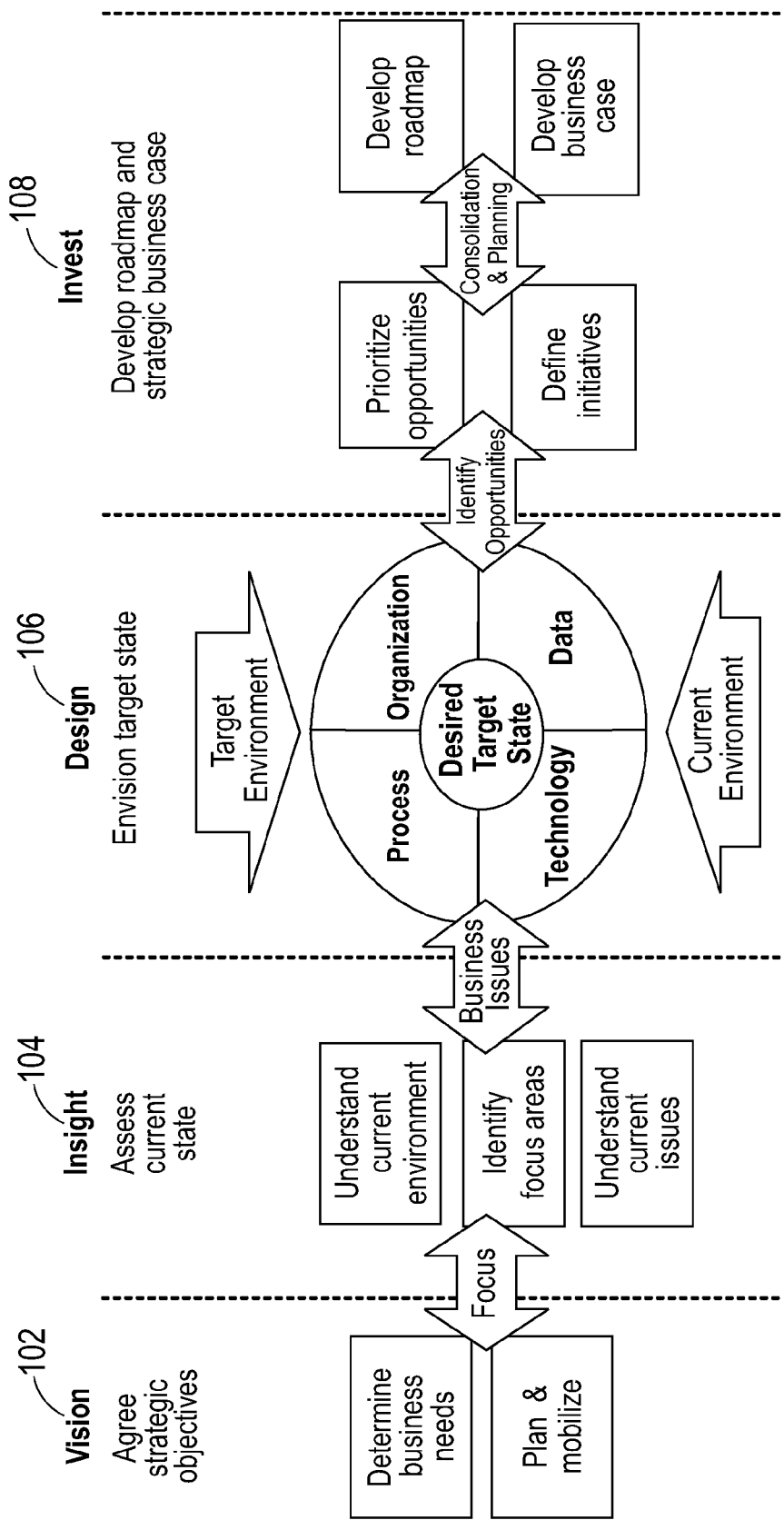
FIG. 1 is an overview of the method and system of the present disclosure in one embodiment.

Business transformation method and system are provided. The method and system of the present disclosure may be embodied as a tool, for instance, a software tool that can automatically analyze business performance, identify transformation opportunities and assess the business value of specific transformation initiatives. The method and system of the present disclosure may help visualize the linkages of various enterprise models such as the business component model (CBM), the business process model, the value driver model, the organization model, the information technology (IT) application model, and the solution model. The method and system of the present disclosure can capture the direct linkages between these models and infer and present the indirect linkages, and from the information captured provide valuable insight on how changing one aspect of an enterprise impacts the others qualitatively.

Using the method and system of the present disclosure, users can examine which business functions and components are underperforming in comparison to industry benchmark measures and why. By investigating the organizational responsibilities and IT application portfolio in conjunction with business components, shortfalls such as duplications, over-extensions, gaps and deficiencies can be identified and reasoned. Specific solutions can be discovered to address the identified shortfalls. Financial benefits of implementing specific solutions can be analyzed further via conducting a business case analysis. The method and system of the present disclosure conducts the above analysis in a structured manner to provide useful insights and various reports to users. In one embodiment, the tool embodying the method and system of the present disclosure may be populated with generic finance and accounting data and can be customized for specific user's or client's need. The tool may employ best practices and methodologies, which also helps address scalability, data management, and governance, linkages to upstream and downstream activities, analyses around benchmarking, component business model-based analysis, and business case preparation.

The following terms are used in the present disclosure and explained below.

Business process: A business process is a flow of one or more business activities. A business process when executed accomplishes a specific business objective. For example, 'Process accounts payable and expense reimbursements' is a typical business process in the finance management domain.

Business activity: A business activity is the lowest level task in a business process. For example 'Accounts Payable' business process contains activities such as: 'Approve Payments', 'Process taxes', 'Retain records,' etc.

A business component: A business component is an abstract business element. It is a collection of similar and related business activities from various business processes. From this point of view, business processes can be thought of as flows of activities between and within components. A component is defined by a set of people, processes and technology needed by its business function. For example, 'Accounts Payable Processing' is a business component, and the 'Process accounts payable and expense reimbursements' business process may contain activities involved in the 'Accounts Payable Processing' component. A business component enables business processes.

Figure 2:
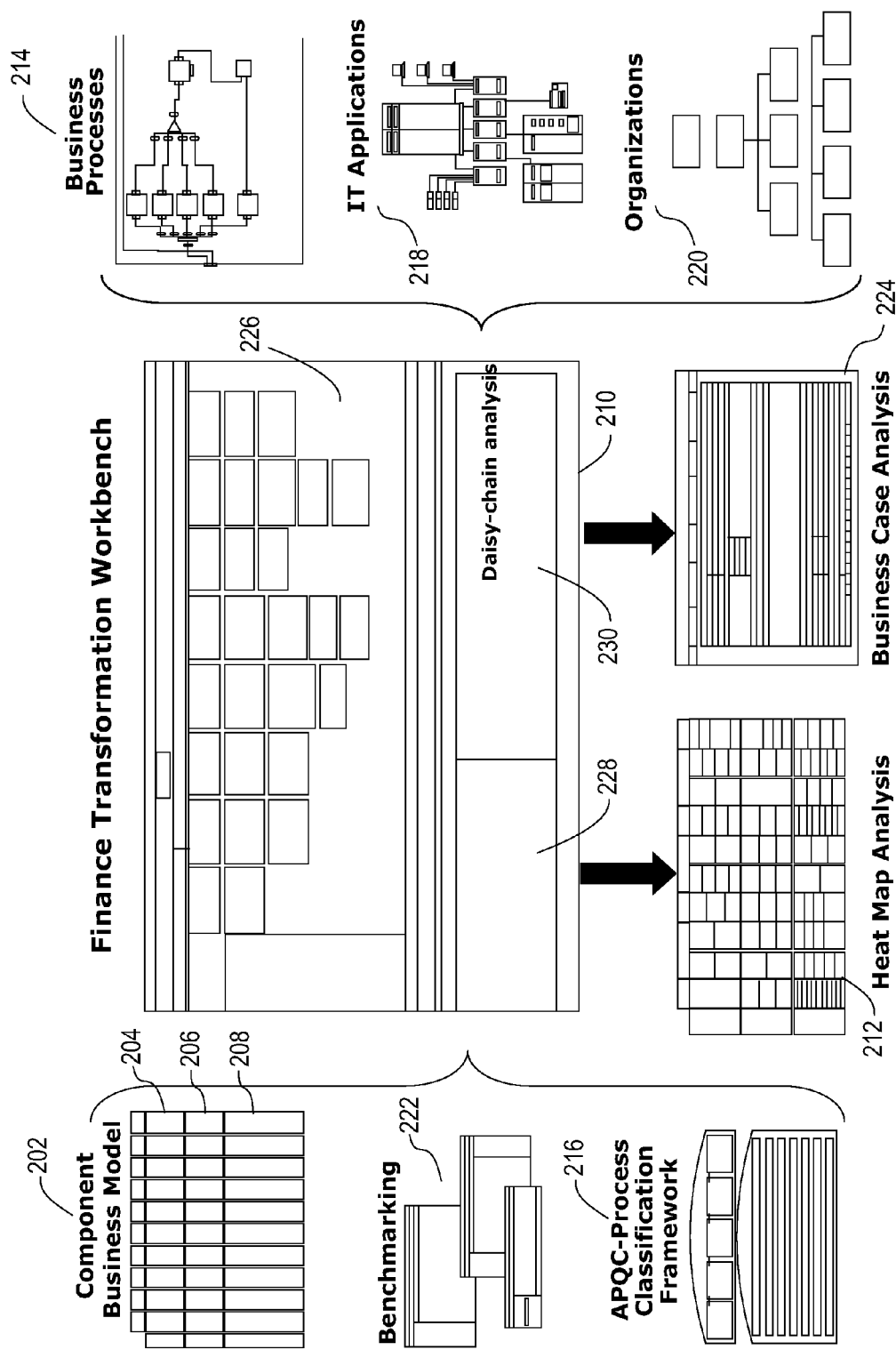
FIG. 2 is an overview of a business transformation (BT) tool environment in one embodiment of the present disclosure.

Component Business Model (CBM): Component business model is a method developed by IBM™ to help analyze clients' business from multiple perspectives such as people, process and technology. The intersection of these views offer improved insights for decision-making. A CBM is a component view of a business where all the similar business activities of a given company's business processes are grouped into components. A sample component business map of a fictitious company is shown in FIG. 2 at 202. It is represented as a two dimensional matrix: The columns are created after analyzing a business's functions, competencies, and value chain. The rows are defined by actions and their accountability levels. The top row, "direct," represents all those components in the business that set the overall strategy and direction for the organization. The middle row, "control," represents all the components that translate those plans into actions, in addition to managing the day-to-day operation of those activities. The bottom row, "execute," contains the business components that actually execute the detailed activities and plans of an organization. The "Component Business Map" shows activities across lines of business, without the constrictions of geographies, internal silos or business units. The component business map for a company is typically represented on a single page. Maps of companies in an industry sector may be similar, but those of different industries may be drastically different.

The method and system of the present disclosure provides an automatic and systematic way for users when embarking upon business transformation initiatives to understand when and where their business is underperforming, how to address the shortfalls, and the impact of the transformation initiatives on their business. For example, what is the impact of a specific process redesign on my current organization? What technology implementations, consolidations and upgrades does the process redesign prescribe? What is the impact of these technological changes on the organization? Should I consolidate the duplicate organizations to form a shared services center internally? Or should I outsource this particular business function altogether? What is the business case for each of these scenarios? The method and system of the present disclosure analyze the business from various perspectives, identify opportunities for improvement, suggest solutions to address those opportunities and help provide the business case for implementing those solutions.

FIG. 1 illustrates an overview of the method for financial transformation, which may comprise four phases, vision 102, insight 104, solution design 106, and invest 108, in one embodiment of the present disclosure. Strategic objectives may be discussed and visualized at 102, for instance, from determination of business needs. In this phase, decision makers of an enterprise discuss their business needs to determine their strategic objectives, for example, revenue growth, cost reduction or earnings per share improvement, etc. This activity can be done by using models such as financial models and software tools, but it can also be done qualitatively through consulting services and workshops. Once the strategic objectives are discussed and determined, at 104, the current state of the business may be assessed, for instance, by understanding current environment and current issues, and identifying focus areas. The understanding of the current environment and current issues, or business pain points drives the requirements of one or more solutions that will address the pain points. Based on the requirements, at 106, the envisioned target state may be designed. For the solution design, decision makers should understand where they stand (current environment) in terms of various aspects of their business, i.e., business process, IT, organization, data, etc. They also have vision to where they want to take their business to, i.e., target environment. The present invention helps the decision makers of businesses, for instance, on every step of the method, from identifying business pain points to understanding where they stand and to identifying solutions to address the pain points and take their business to the target environment. Additionally, in case there is a plurality of business points identified and a plurality of solutions identified in the previous steps of the method, at 108, opportunities with solutions may be assessed, prioritized by their cost and benefit, and developed.

Figure 6:
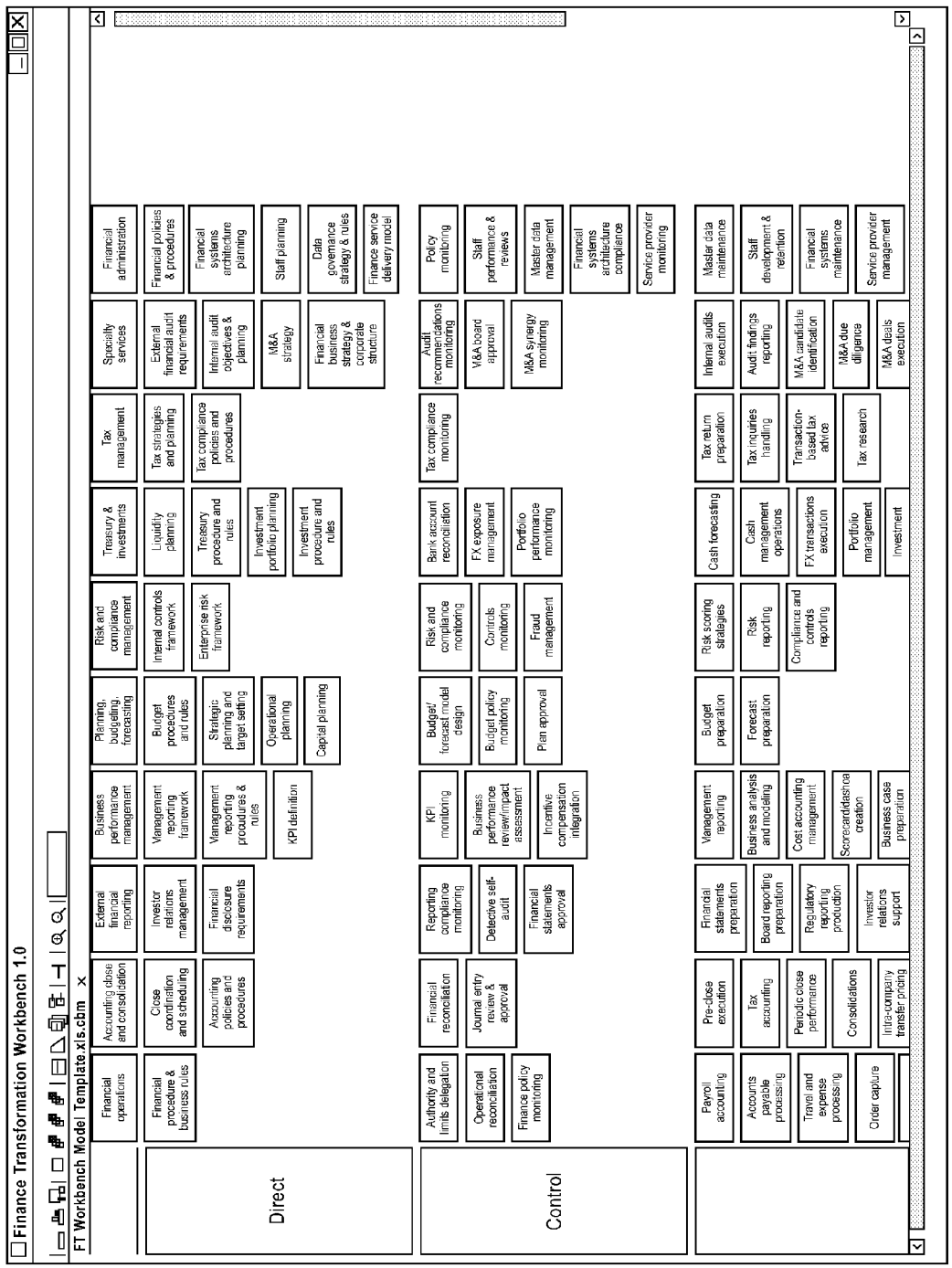
FIG. 6 illustrates a component business model rendered in BT tool of the present disclosure in one embodiment.

FIG. 2 is an overview of a business transformation (BT) tool environment in one embodiment of the present disclosure. In this disclosure, Financial Transformation (FT) is also referred to as Business Transformation (BT). BT tool of the present disclosure provides an integrated view of various business models and data, for example, including component business models 202, a business process model such as APQC (American Product Quality Council) Process Classification Framework (PCF) 216 and SAP Business Process Hierarchy (BPH), a value driver model, an IT infrastructure map 218, an organization structure map 220, and a solution catalog, with the models linked each other. Another example of component business model (202) is shown in fuller view in FIG. 6. A business transformation (BT) tool environment in one embodiment of the present disclosure automates traditional component business model-based analyses in the form of visual queries and inference in one embodiment. For example, one can ask questions such as which metrics help measure the performance of a given business component? What are the IT systems that support the business functions represented by a business component? Which organizations implement the business functions represented by a business component? Which transformation solutions can address a given shortfall? These questions are answered in the tool via the explicit and the inferred linkages made among different models such as the component model 202, IT system model 218, organizational model 220, metrics model 222, business processes model 214, etc. This is also referred to as daisy chain analysis in the tool.

The BT tool of the present disclosure automates the component performance analysis by comparing the metrics that help measure the performance of a component with benchmark data 222. This is referred to as "heat map" analysis in the tool. An example view of a heat map is shown at 212. The underperforming components can be marked as shortfalls based on whether it is caused by a misaligned IT system or by an organization. This identification and marking of shortfalls is referred to as "shortfall assessment" in the tool. The tool provides business benefit analyses in terms of value drivers and standard financial metrics for business case analysis 224 such as NPV (Net Present value), IRR (Internal Return Rate), ROT (Return on Investment), and payback time. The BT tool provides normative and constructive business performance analysis models, so it can be easily configured for different types of clients, initiatives, and projects.

In one embodiment, BT tool may provide views of enterprise CBM maps 226, value drivers 228, and business activities 230 and provides navigation through all of them. It enables analysts to navigate the views and identify dependencies and causal relationships among value drivers 228 and business activities 230 and components 226. It also enables analysts to pinpoint business activities and value drivers supported and improved by solutions and services. It provides detailed value driver reports with charting generated by advanced value modeling. Also, it provides detailed financial analysis reports with charting generated by advanced value modeling.

BT tool of the present disclosure may comprise a Model Template, which may be an Excel™ file providing a template for data preparation and storage for analyses; Transformation Analyzer, which may be a Windows™ application where the user can explore various model views, conduct CBM-based analyses, and identify transformation initiatives for proposal; and Business Case Calculator, which may be an Excel™-based tool where the user can perform business case analysis for the initiatives identified in the Transformation Analysis. These three components may be seamlessly connected to each, and so the user can move back and forth among the components in a straightforward manner. Details of various functionalities of the BT tool are described below.

Model Template

To run business transformation analyses in the system, a set of models and content are prepared following a set of rules. The content preparation can be done by using the provided Model Template, which may be an MS Excel™ file or another spreadsheet application or like, with formatting for the content. The content preparation may include preparing the base models, for example, the six base models. The six base models, for instance, include models for Business Component, Business Process, Value Drivers, Applications, Organizations, and Solutions. The content preparation also includes linking or mapping these base models. Model mapping is described in further detail below.

In one embodiment of the BT tool, content for the base models (e.g., the six base models) are provided in six separate worksheets in the Model Template: one model in each worksheet Business Component, Business Process, Value Drivers, Applications, Organizations, and Solutions. The BT tool may include a set of sample content for each of the base models (e.g., the model templates populated with initial or default data), for example, derived from available benchmark data, such as APQC, IBM Benchmarking data, and solution and service offering catalogs. Data entries such as metric may have a set of attributes, which may be used in various analyses.

In one embodiment, the Business Component worksheet provides a tabular representation of a CBM map. Business components are grouped by their competencies and each component has its accountability level, i.e., direct, control or execute, as an attribute.

The Business Process worksheet in one embodiment provides a hierarchical representation of a business process structure, e.g., APQC PCF (Process Classification Framework), SAP BPH (Business Process Hierarchy), or IBM EPF (Enterprise Process Framework).

The Value Driver worksheet in one embodiment provides a hierarchical representation of Key Performance Indicators (KPI) of business processes. At the lowest level, it provides business metrics which are used to measure the performance of low level business activities of the Business Process Hierarchy. The Value Driver worksheet may be pre-populated with one or more attribute values such as one or more benchmark values and the business' current value. The low level metrics are grouped into one or more higher level indicators. At the highest level of the Value Driver tree, the indicators are grouped into financial metrics of enterprises such as cost, revenue, profit, share value, etc.

The Applications worksheet in one embodiment provides a hierarchical representation of the IT infrastructure and applications the enterprise or entity is currently deploying. This information is used in one embodiment of the method and system of the present disclosure to understand where the enterprise stands, and identify any shortfalls in terms of IT.

The Organizations worksheet provides a hierarchical representation of the human resources and organizations the enterprise currently employs. This information is used in one embodiment of the method and system of the present disclosure to understand where the enterprise stands, and identify any shortfalls in terms of human resources and capital.

The Solutions worksheet provides a hierarchical representation of solutions that may address identified shortfalls in business process, IT, data, and human organization. The solution may be software, services and their combinations. A solution does not have to be complete when offered. Instead, it may be composed and designed on demand to address a specific shortfall that is identified.

In one embodiment each model includes data structured in a tree format or view. FIG. 3 shows an example of the value driver tree in the Model Template with metrics attributes such as value type (column I), value unit (column J), benchmark value (column L), median value (column K), as-is value (column M) and to-be value (column N). The as-is value is the current value of the particular metric of the current business, i.e., where the business stands. The to-be value is the target value of the metric the business wants to achieve by applying one or more solutions, i.e., where the business wants to go. The benchmark and median values are reference values. They are compared with the as-is and target values to understand where the business stands and where the business wants to go in the group of peer enterprises. For example, if the as-is value is worse than the benchmark value, i.e., the best practice value among peer companies, the decision makers will want to improve it to the benchmark value level. That is, the to-be value will be the benchmark value. In one embodiment, the model content is generically in a tree form. As long as the structure is maintained, the user can add, delete and modify instances in the tree. In one aspect, a model worksheet may be named after the model that will be in it.

Model Mapping

In one embodiment of the BT tool of the present disclosure, models are mapped to each other. This linking enables the capability to answer various queries. This linking of models and the ability to query them are also referred to herein as "Daisy-Chain analysis." With binary mapping of models, the system infers correlations across multiple models, which provides qualitative understanding on how models are related. For example, with the daisy-chain analysis, the user can see all the business processes and activities that are associated with a business component. In turn, the user can see all the metrics (along with their values) and value drivers of the selected business processes, and so the user can qualitatively see the overall performance of the component.

Figure 4:
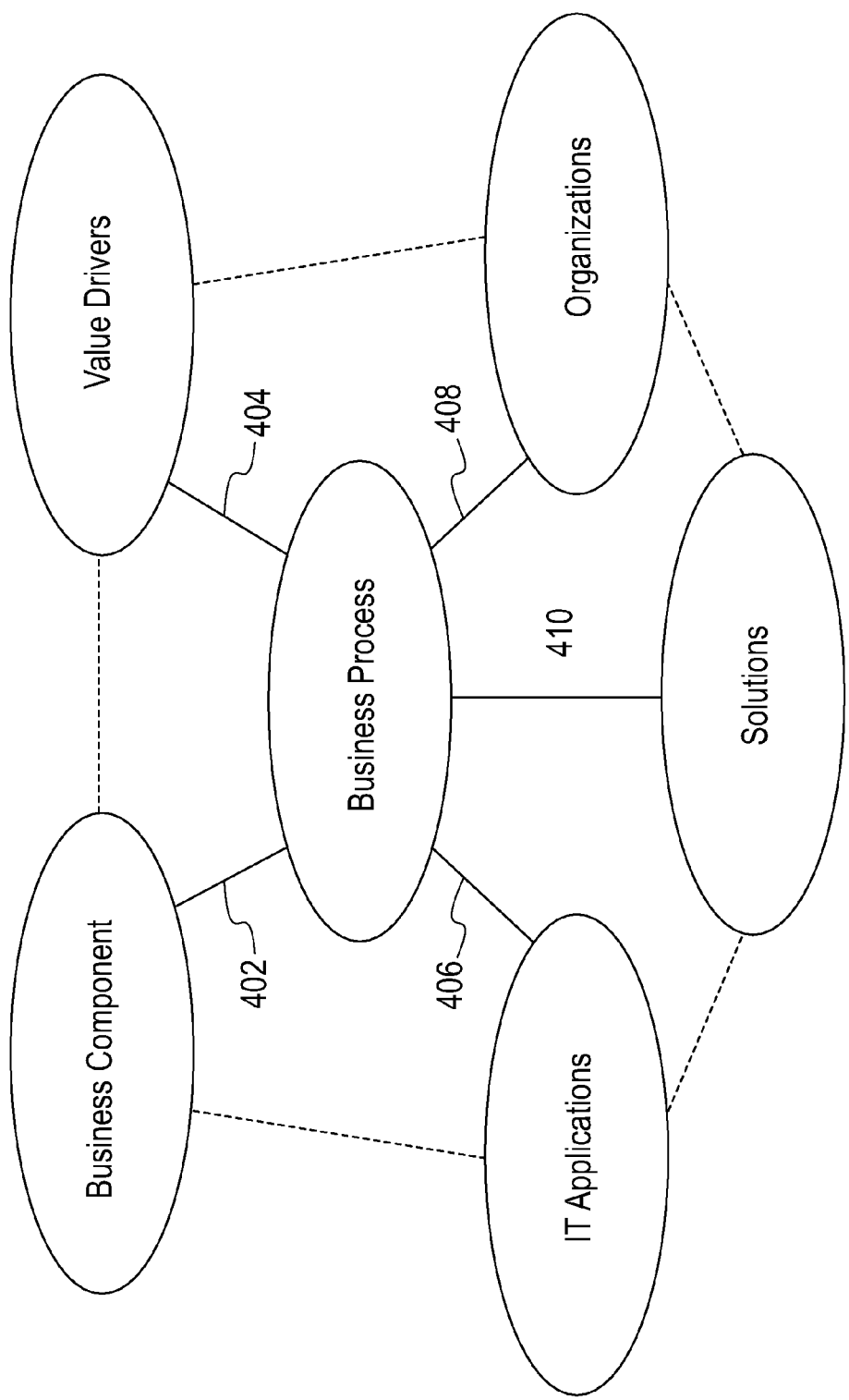
FIG. 4 illustrates a daisy chain model in one embodiment of the present disclosure.

FIG. 4 illustrates daisy chain of models in one embodiment of the present disclosure. For the six base models, the user may provide initial model mapping to Business Processes in the Model Template file, e.g., five types of links, i.e., Comp2BizProc 402, VD2BizProc 404, App2BizProc 406, Org2BizProc 408, and Sol2BizProc 410. In one embodiment, the BT tool uses a hub-and-spoke approach to linking of models, i.e., all models are linked to the business process model instead of each model linking to each other model as shown in FIG. 4. Each model mapping is stored in a separate mapping worksheet bearing the mapping name. The Model Template file provides a set of sample model mapping in the mapping worksheets. For instance, each mapping type has a worksheet. The mapping may be done manually by subject matter experts or business consultants. The mapping is used for the daisy-chain analyses. The explicit mappings stored in the mapping worksheets are used to infer implicit relationships among models in the daisy-chain analyses. The user can add, delete, modify instances in the mapping worksheets by changing entries in the source cell and target cell columns. If the user does not want to create model mapping information at this stage, the user may remove the provided sample data in the mapping worksheets (or worksheets themselves). This model mapping information in this file is optional, and not required to run the tool for analyses.

Figure 5:
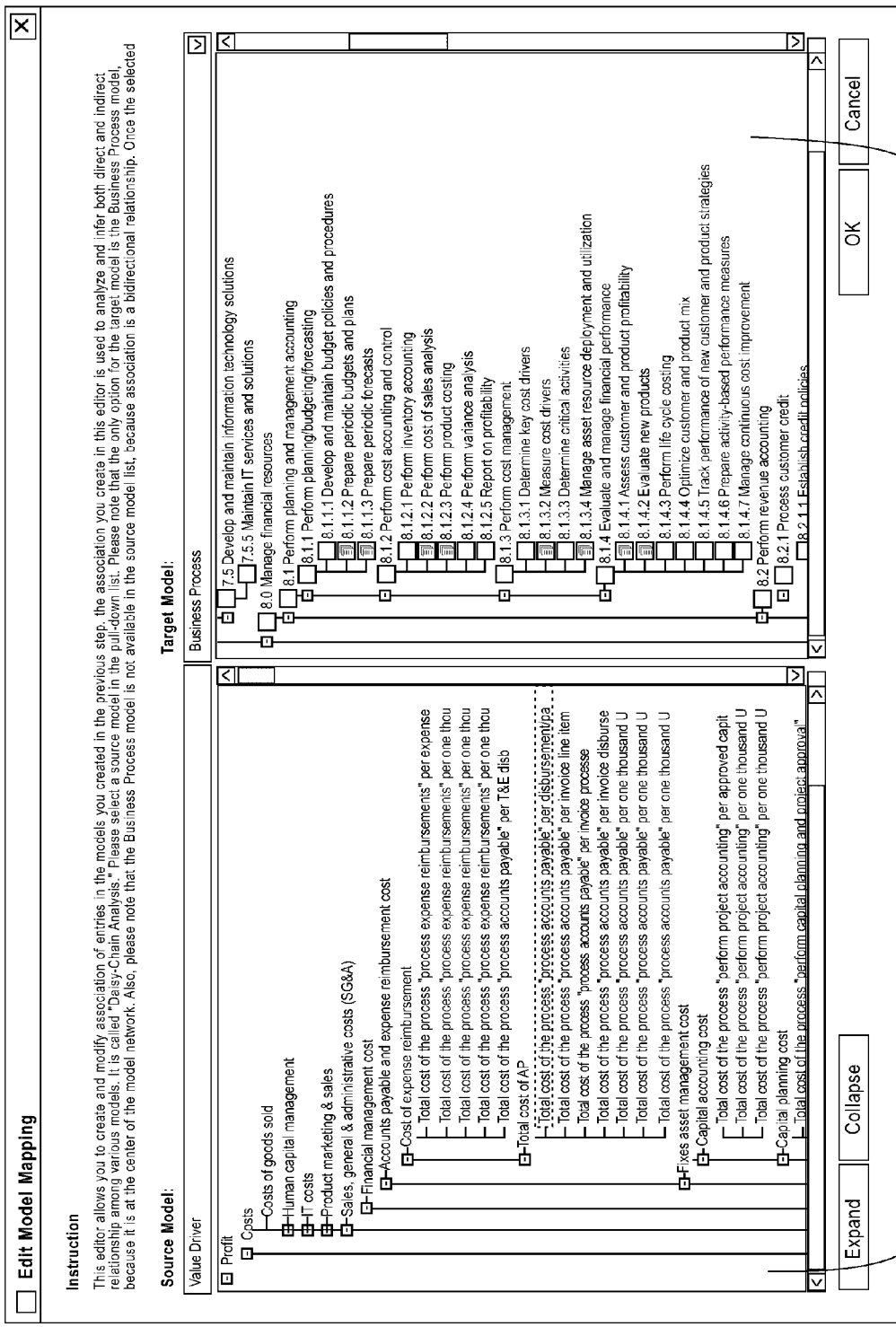
FIG. 5 shows a model mapping editor in one embodiment of the present disclosure.

BT tool additionally may provide a user interface, e.g., Model Mapping Editor, for creating model mappings. Additional model mapping created with the editor may also be added to the Model Template file, when saved in BT tool. FIG. 5 shows the graphical user interface (GUI) editor for model mapping. It allows the user to select a source model and a target model. On the source side mappings are to be made from the leaf nodes, i.e., nodes with no child nodes. All other nodes of the tree are grayed out. The target model in one embodiment is always the business process model. The model mapping editor also provides tree views of the selected source and target models. In the tree view, the user can map entries in the source and the target models by using check-boxes and buttons. The editor may be implemented using programs such Visual Basic™ or other programming languages.

The BT tool of the present disclosure in one embodiment allows mappings to be made to all levels of the business process tree. FIG. 5 at 502 shows an example of a business process. For example, "8.0 Manage Financial Resources" is a business process. It includes multiple subgroups, i.e., 8.1, 8.2, . . . , and multiple levels, i.e., 8.0=>8.1=>8.1.1=>8.1.1.1, as shown in the window 502. Mappings are allowed to be made at all levels of the business process tree mainly to deal with mappings between metrics and business processes. For instance, in FIG. 5, a metric in Value Driver tree 504, e.g., "Total cost of account payable process" can be mapped to a business process at any level of the Business Process tree 502, e.g., 8.0, 8.1, 8.1.1, or 8.1.1.1. Metrics as used herein refer to quantitative measures that indicate the performance of the business process. There may be metrics for all levels of business process. For example, benchmarking wizard tools may have measures and metrics at process level, at process group level. There may be metrics even at the process category level. The Model Mapping Editor allows the user to capture such mappings. In one embodiment, the BT tool does not allow for the same kind of possibility from the source side because opening up the entire tree on both sides could create possibilities for redundant mappings and sometimes even conflicting mappings. To avoid any confusion and redundancy in mappings, the source side opens for mapping only at the leaf node level whereas on the target side mappings are allowed to be made at all levels.

All the mappings in one embodiment of the present disclosure are bi-directional, meaning A is mapped to B, and then B is mapped to A automatically. In order to avoid duplication in mapping, the target model may be fixed to Processes. Every model (source) may be mapped to Process (target). However, Process is not mapped to any model manually. Instead, that part is implied by the first mapping. The mapping or associations made to children get propagated up to the parent but not vice versa in one embodiment. If a component is mapped to a process, it is not assumed that the component implements all activities in that process. For this reason, the BT tool in one embodiment does not propagate process level mappings down to activities.

The prepared content in the Model Template file, for instance, a spreadsheet file such as an Excel™ file is passed and validated by the BT tool. If the content does not follow the required format set by the rules, a functional module in the BT Workbench such as data validating program, generates error messages to help the user repair the format of content.

Transformation Analyzer

The Transformation Analyzer component of the BT tool in one embodiment provides the following analysis capabilities, although the Transformation Analyzer's functionalities need not be limited to only those listed here: Daisy-Chain Analysis; Business Component Performance Analysis (also referred to as Heat Map Analysis); Shortfall Assessment for both IT application and organization; Solution Analysis; Business Report Generation, for instance, in MS Excel™ and PowerPoint™.

Component Business Modeling described above is a novel business modeling technique from IBM™, which enables users to understand and transform businesses. A component business model represents the entire business in a simple framework that fits on a single page. It is an evolution of traditional views of a business, such as ones through business units, functions, geography, processes or workflow. The component business model methodology helps identify basic building blocks of business, where each building block includes the people, processes and technology needed by this component to act as a standalone entity and deliver value to the organization.

After a comprehensive analysis of the composition of each business, a user can map these individual building blocks, or components, onto a single page of a user interface screen, for example as shown at 226 in FIG. 2. Each component business map may be unique to each company. The columns are created after an analysis of a business's functions and value chain. The rows are defined by actions. FIG. 2 at 202 shows an example of a Component Business Model map rendered in the BT tool. The top row, "direct," 204 shows all of those components in the business that set the overall strategy and direction for the organization. The middle row, "control," 206 represents all of the components in the enterprise, which translate those plans into actions, in addition to managing the day-to-day running of those activities. The bottom row, "execute," 208 contains the business components that actually execute the detailed activities and plans of an organization. The component business map shows activities across lines of business, without the constrictions of geographies, internal silos or business units.

This single page perspective 226 provides a view of the business, which is not constricted by barriers that could potentially hamper the ability to make meaningful business transformation. The component business model facilitates to identify which components of the business create differentiation and value. It also helps identify where the business has capability gaps that need to be addressed, as well as opportunities to improve efficiency and lower costs across the entire enterprise.

The "Daisy-Chain Analysis" is a visual query that allows the user to explore the business maps and understand the correlations and dependencies among business entities. The results of the query are shown in the views 210 of the models in the BT tool highlighting entries in the models that are associated directly and indirectly. For example, this capability can interactively identify one or more business components associated with a particular value driver. Conversely, it can find one or more value drivers that are affected by the performance of a particular business component. The associations between value drivers and business components are discovered through their relationships with business processes and activities set by using the Model Mapping Editor. Similarly, BT tool can identify and show dependencies between business activities and IT applications, and also between business activities and solutions and initiatives, both IT and business-driven.

Figure 7:
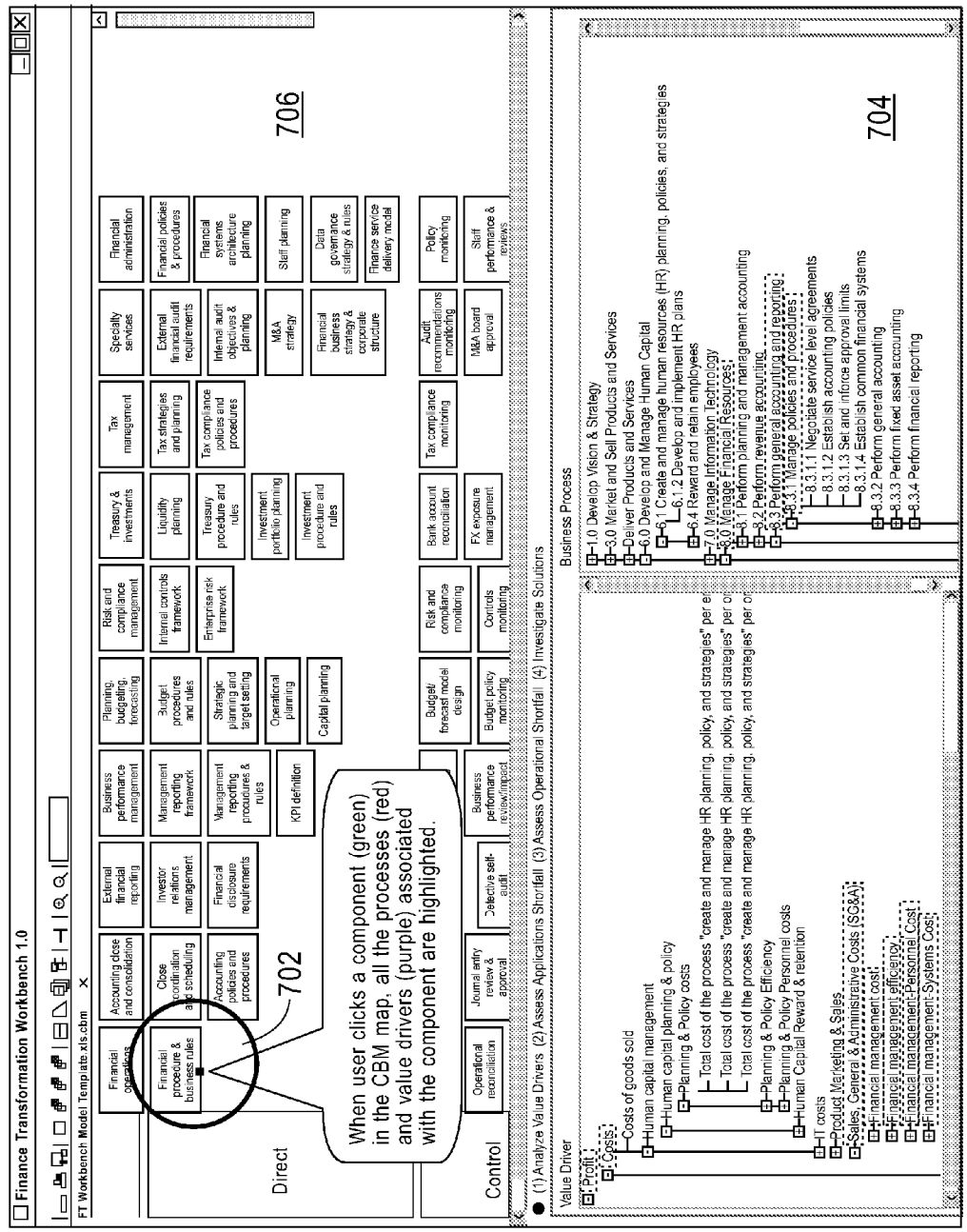
FIG. 7 illustrates a graphical user interface that enables daisy chain analysis in one embodiment of the present disclosure.

The relationships are transitive, and so it is possible to infer indirect associations between value drivers and IT applications/solutions, also between components and IT applications/solutions, and so on, through their direct linkages with entries in the business process model. Also, transitivity is used in inferring indirect relationship to ancestor entries when there is a direct relationship set for a child in a tree structured model. FIG. 7 shows an example of a user interface that includes a business component model 706 built from a template and Daisy-Chain Analysis 704 when a business component, "Financial Procedures & Business Rules" is selected, for example, by clicking on the box 702. The BT tool highlights all the business processes directly linked to the component, and also highlights all the metrics and value drivers indirectly linked to the component through those highlighted business processes. The user can see attribute values such as the as-is value and benchmark value by a mouse-over operation. To support the Daisy-Chain Analysis, the BT tool captures the basic relationship information in the Model Template file and also linkages set up with Model Mapping Editor.

The Business Component Performance Analysis allows the user to discover one or more "hot" components that are associated with one or more business strategies and/or pain points. A pain point is an area where a company is noted to be underperforming in comparison to its peers or industry leaders or expectations set by the company or combinations thereof. In the traditional CBM analysis, this step was conducted manually by the business consultants relying on knowledge and expertise in the business domain. The BT tool of the present disclosure automates the capability as visual queries, by taking metrics values into account with the analysis. The BT tool allows the user to explore the value driver tree. The Value Driver tree is a hierarchical representation of Key Performance Indicators (KPI) of business processes. At the lowest level, it provides business metrics, which are used to measure the performance of low level business activities of the Business Process Hierarchy. The Value Driver tree may also include attribute values such as one or more benchmark values and the business' current value associated with those metrics. The low level metrics are grouped to one or more higher level indicators. At the highest level of the Value Driver tree, the indicators are grouped into financial metrics of enterprises such as cost, revenue, profit, share value, etc.

Figure 8:
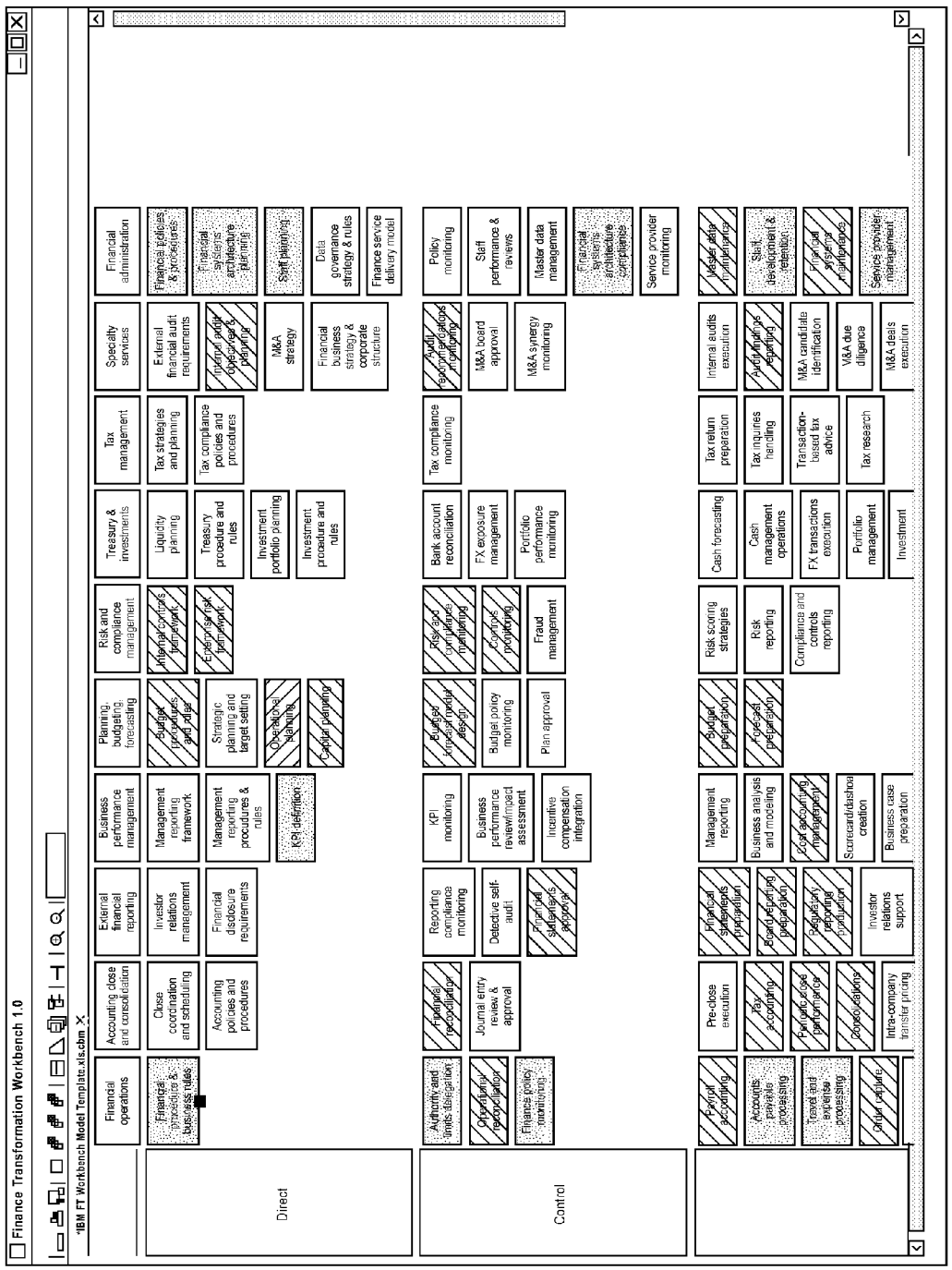
FIG. 8 illustrates a CBM map after business component performance analysis is performed.

Using the value driver tree, one or more value drivers can be identified that may be associated with a certain business strategy/pain point. The discovery of "hot" components that affect the business strategy can be accomplished. Various visualization techniques may be employed, for example, coloring the identified hot components differently to distinguish ones that affect positively or negatively to the strategy. The BT tool system compares the industry benchmark and the as-is value of the operational metrics and performance indicators associated with the components to decide on their color. FIG. 8 shows an example of a CBM map showing the result of a Business Component Performance Analysis.

An algorithm for coloring business component in the Business Component Performance Analysis is as follows: The BT tool system compares the three values—as-is (from client), benchmark, and median values of each metric associated with each business component. Benchmark and median values may be obtained from available benchmarking tools, benchmark data repositories, etc. For example, APQC provides sets of benchmark data for fee. Benchmark data may be also obtained from tools that survey and collect metrics value of a plurality of business processes from a plurality of members and/or customers. The data is then analyzed statistically. For example, the benchmark value of a metric is the 90 percentile value. The median value is the 60 percentile value, etc. If necessary, there can be more than one value like benchmark and median for comparisons. The business component is colored green, if the as-is value of each and every metric associated with this component is better than the corresponding benchmark value. The business component is colored yellow, if it has at least one metric whose as-is value is better the median value but worse then the benchmark value, and all the other metrics have as-is value, which is better than the benchmark value. The business component is colored red, if it has at least one metric whose as-is value is worse then the median value. The notion of "being better" compares differently for different metric value types: For the "Less is Better" type: A is better, if A<B. However, for the "More is Better" type: A is better, if A>B.

Depending on analysis needs, there may be many variants of the component color coding algorithms for the Business Component Performance Analysis. The following algorithms may be utilized:

AT LEAST ONE: The Business Component Performance Analysis engine identifies all the business components associated with the current value driver, and discovers ones at least one of whose associated metrics has the as-is value worse than the benchmark value; the engine colors the components red, while coloring the other components green. This algorithm is most aggressive in identifying "hot" components.

ALL: This algorithm is at the other end of the spectrum of Business Component Performance Analysis algorithms. It is most generous in identifying "hot" components. The Business Component Performance Analysis engine discovers business components all of whose associated metrics have the as-is value worse than the benchmark value; the engine colors the components red, while coloring the other components green.

MAJORITY without weights: This algorithm is in the middle of the spectrum. The Business Component Performance Analysis engine discovers business components more than half of whose associated metrics have the as-is value worse than the benchmark value; the engine colors the components red, while coloring the other components green.

MAJORITY with weights: This algorithm assumes some weight value assigned to each metric. Also, it assumes a threshold value that compared to a component's "heat" value. The heat value of a component is computed by applying the difference of as-is values and benchmark values of associated metrics and their weights. Depending on how the equation is formulated, this algorithm can provide various results. This can be a generic algorithm for the three special cases above.

In another aspect, the spectrum of colors may be used to indicate the results of the performance analysis. More colors can be added (in addition to red and green) to represent the "heat" degree ("temperature") of components. One example is the use of yellow in FIG. 8 to indicate the mediocre performance between red and green.

The Shortfall Assessment allows the user to map the existing IT infrastructure or organization structure against the "hot" components identified in the Business Component Performance Analysis. It helps in understanding of how the current IT infrastructure or organization structure, such as applications, network capabilities or certain departments, supports the business, especially, for those hot components. The analysis includes collecting the information on the current IT infrastructure or organization structure. Then the mapping of IT applications or organization structure to the components becomes, again, an execution of a simple data query to the basic model mapping. For example, as shown in FIG. 4, IT Applications may be manually mapped 406 to Business Processes during the data preparation, and the mapping information stored in the Model Template. Additionally, Business Components may be manually mapped 402 again to Business Processes, and the information also stored in the Model Template. By using this mapping information in the Model Template, the system and method of the present disclosure may discover indirect, implicit relationships between IT Application elements and Business Components. The discovery becomes the result of the IT Application Shortfall Assessment query and it is visually rendered as color-coded triangles (e.g., representing individual IT Applications) overlaid on top of associated Business Components in one embodiment. The Organization Shortfall Assessment query works in similar manner, for instance, using different mapping information, i.e., Organizations-to-Business Process mapping 408 instead of the IT Application-to-Business Process mapping 406. The Organizations may be represented by color-coded squares in the view, instead of color-coded triangles, to distinguish IT Applications and Organizations overlaid on Business Components.

BT tool visualizes the mapping on the CBM map by overlaying IT applications and/or organization structure on components. Then, the user can visually classify possible IT shortfalls into several types. Typically, four types of opportunities tend to arise. First, a gap indicates that a hot component does not have any IT/organizational support. The enterprise may want to consider an IT/organizational investment to improve the component's performance and support the intended business transformation. Second, a duplication indicates that a component is supported by multiple IT applications or multiple departments, possibly, deployed over time. The business may want to consolidate the applications to improve performance and reduce cost in communication and maintenance overhead. Third, a deficiency indicates that the current application lacks key functionality, or is poorly designed, and so incurs a project opportunity. Fourth, an over-extension indicates that a system designed to support one business component is extended beyond its core capability to support others. Different definitions for the shortfall types may apply.

Figure 9:
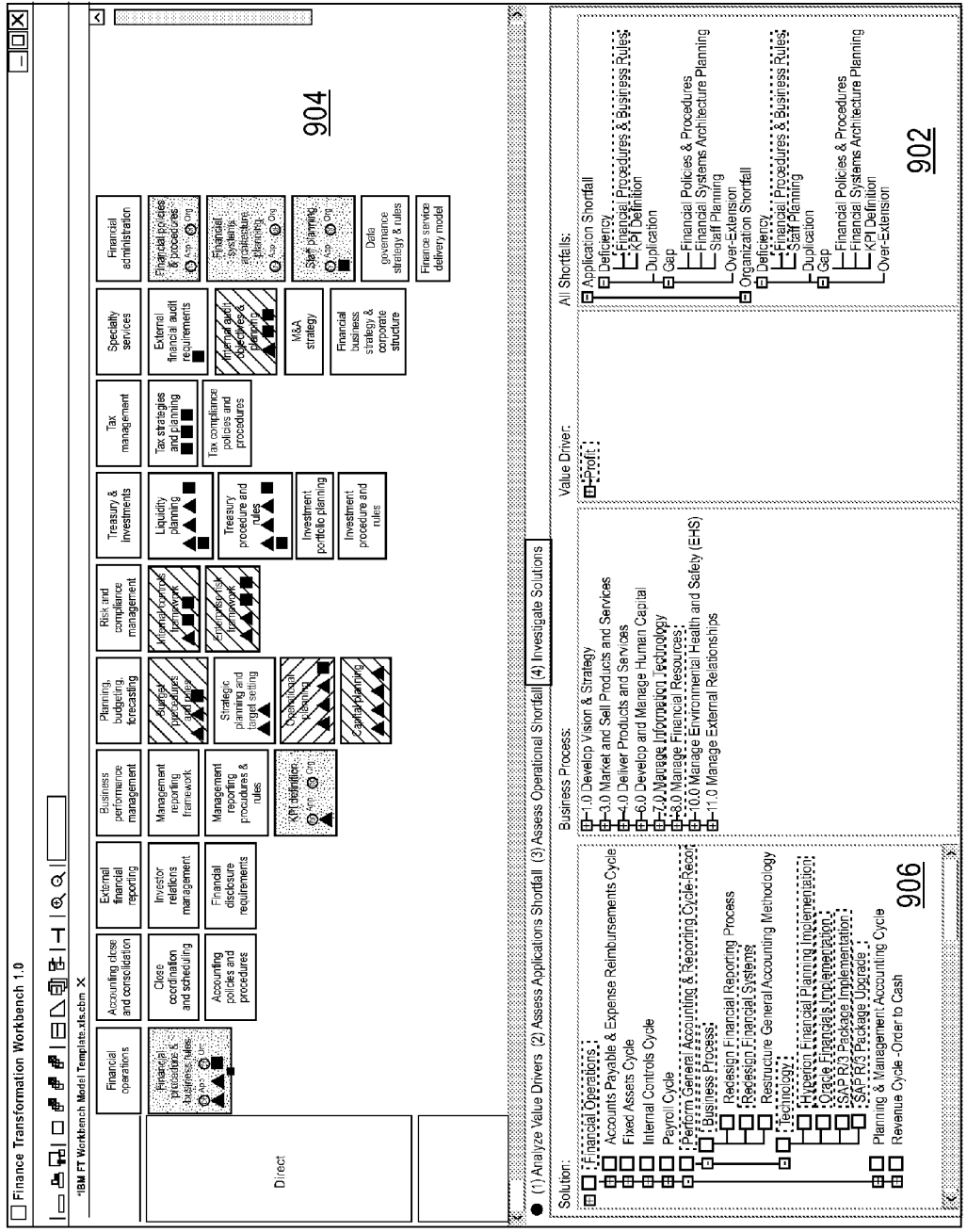
FIG. 9 illustrates a graphical user interface that shows shortfall assessment.
Figure 15:
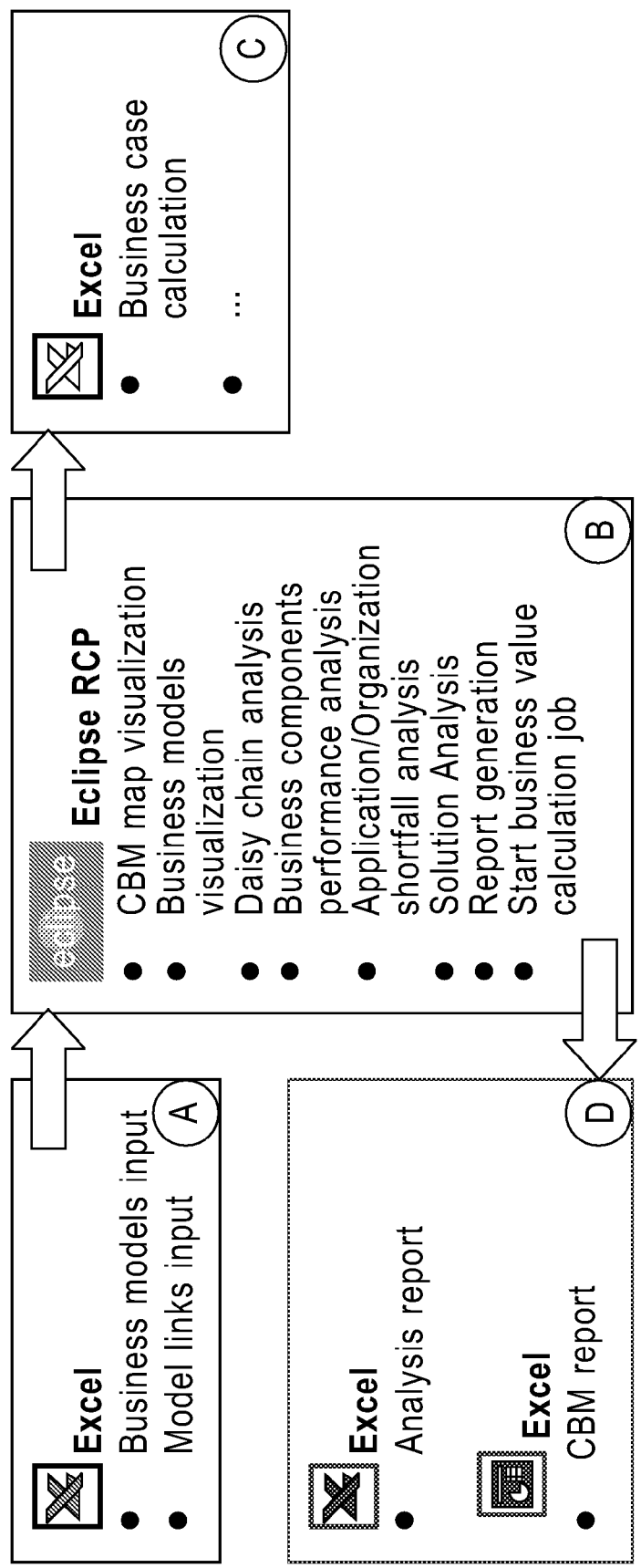
FIG. 15 illustrates system architecture of the BT tool in one embodiment of the present disclosure.

FIG. 9 shows a BT tool view after a shortfall assessment. Colored triangles overlaid on hot components represent IT applications of the business under analysis, while colored squares represent organizations. Other visualization codes or shapes are possible. The overlay helps the users visually categorize and label shortfalls. A user interface such as fields for populating may be provided to aid the user in labeling the observed shortfalls. For instance, the user finds a "gap" when the user sees a "hot" component (red from the heat map analysis) without any IT application (those triangles overlaid) supporting the component. The user finds a "deficiency" when the user sees a hot component with one or more application supporting it, but its performance is still not enough (red). It needs strengthening of the IT application. The user finds a "duplication" when the user sees a component having more than one applications supporting it. One may want to consolidate them to reduce the overhead cost in maintenance and communication. The user sees an "over-extension" where an IT application supports more than one components. Ideally, an application supports only one component and works independently of other components. One may want to refocus the application to only one component. The determination of shortfall types may take other information into account such as qualitative factors, which the user has knowledge of. In another embodiment, this IT shortfall discovery can be automated by using one or more pattern recognition algorithms. As the user labels the identified shortfalls to components, the labels also visually remain on the hot components. Additionally, the business components labeled having one or more shortfalls may be added to the shortfall tree 902, which is shown at the lower right-hand corner of the screen in FIG. 9.

Once IT and/or organizational shortfalls are identified and classified, one or more solution catalogs are used to identify IT transformation initiatives to address the shortfalls and support the intended business transformation. The BT tool allows the user to explore the solution space to identify one or more solutions that may address one or more shortfalls of interest. The discovery of solutions for supporting components associated with a shortfall can be automatically conducted by executing the "Daisy-Chain" queries that correlate solutions and components by using their relationships to business processes. In addition, the BT tool allows the user to manually correlate them, if desired. For example, by applying the "Daisy-Chain Analyses" of the present disclosure, one or more solutions for the Business Components having one or more shortfalls in terms of IT Applications and/or Organizations can be discovered. That is, an inference of indirect, implicit relationship between one or more Solutions and one or more Business Components having one or more shortfalls, by using explicit, direction relationships 410 between Solutions and Business Processes and relationships 402 between Business Components and Business Processes may be used. An inference engine may be provided as part of the daisy chain analyses to automatically infer the indirect relationships to discover the solutions for the Components with Shortfalls.

For example, the shortfall tree 902 (and the CBM view 904) shown in FIG. 9 indicates that the "Financial Procedures & Business Rules" component has deficiencies in IT applications and organizations supporting it. A click on the component in the shortfall tree highlights all the possible solutions for the component from the solution catalog 906 shown in the lower left-hand corner of the screen. The inference of solutions and initiatives for a business component is an example of the daisy-chain analysis. By using the model mapping captured in the daisy-chain of models described above, the BT tool system identifies solutions indirectly linked to a component through their direct relationships to business processes.

The BT tool in one embodiment generates a number of business intelligence reports for an executive summary of the analyses. The reports may include interactive charts. The BT tool allows for saving the shortfall assessment results in the Model Template file (e.g., Excel™ file), so that the analysis results and annotations can be viewed again in later BT sessions. It generates a simple Analysis Report in as spreadsheet file such as an Excel™ file, which shows the analysis results from the Business Component Performance Analysis, the Shortfall Analysis, and the Solution Investigation Analysis. The user can perform further spreadsheet-based (e.g., Excel™ based) analyses using the data exported from the BT tool. In addition, the user may add, delete and/or edit annotations on the analysis results in this report file. Furthermore, the user may export CBM-based analysis results, i.e., various heat maps, to a presentation program or related file such as MS PowerPoint™ file for viewing, annotation, and presentation. FIG. 10 shows an example of a heat map (only the "Direct" part) exported to a PowerPoint™ file. The BT tool may also export the identified solution and the associated business processes to the Business Case Calculator tool for further business case analysis.

The above-description disclosed how a user can identify opportunities for business transformation using the BT tool. The BT tool of the present disclosure in one embodiment may also include a business case calculator tool that can be used to evaluate recommended solutions to build business cases from them. The evaluation accurately models the potential benefits that can be achieved by implementing the recommended solutions while at the same time considering the costs and investments involved.

In one embodiment, the Business Case Calculator (BCC) is a spreadsheet application based tool, for example, MS Excel™-based, with a pre-built template for conducting financial analysis of investments. The pre-built tool has templates for capturing aspects of financial analysis: costs and benefits. The financial models include Discounted Cash Flow (DCF) and real-options analysis. If the benefits outweigh the costs in present day's terms, then the project is expected to be profitable. The BCC tool also provides templates for conducting sensitivity analysis to estimate the variance of expected profits. It also calculates the standard financials such as Return on Investment (ROI), Net Present Value (NPV) and Internal Rate of Return (IRR) of the project, and break even period. The advanced analytics provide a real-options model to analyze the value of staging decisions in a project. The details of the Business Case Calculator module embodied in the BT tool is described below.

BCC embeds and provides the APQC processes and their metrics, for example, for Finance & Accounting domain. It provides a method for automatically adding new benefits on the fly to the analysis. When a new benefit is created, it provides in-built linkages to other parts of the analysis for it to be automatically included (if user so chooses) in the overall analysis. It links up the Business Case Calculator with other qualitative analysis and the CBM-based analysis of business transformation opportunities.

The BCC tool standardizes the key input and output of a typical business case, and yet, allows enough flexibility for users, to modify and add benefits and reports, making it easier to customize the application for the needs of a particular project. For example, users can change the period of analysis (quarterly, yearly, etc.), forecast duration (the number of years), discount rate and benefits realization options (standard vs. custom), for example, via user interface shown in FIG. 11.

When a particular business transformation initiative is implemented, it impacts the metrics of the process. Given a specific solution, the processes that will get impacted and their corresponding metrics that will be improved are automatically loaded into BCC from the BT tool. In addition, the industry benchmark values for these metrics and the as-is values of the clients' performance metrics are also loaded from the Model Template file which stores the data prepared at the beginning of analysis. Assuming that, as a result of implementing best-practice solution implementation, the client's metrics improve from the as-is values to the industry median or even the best in the pack, BCC can automatically compute the potential benefits attainable. This calculation may serve as a baseline for the user to work with. In addition, BCC provides flexibility in the benefit calculation, so that the users can fine-tune the benefit calculation, and/or add additional variables or additional benefits altogether. FIG. 12 shows an example of the benefit calculation worksheet, which shows the calculation of benefits from improvement in Accounts Payable process. In this worksheet, the users can select the period of analysis (quarterly, yearly, etc.), forecast duration (the number of years), discount rate and benefits realization options. In addition, the BCC tool can accommodate several benefits, group them into categories, and link those categories to the high level KPIs (Key Performance Indicators), resembling the value trees. This capability makes it easy to find out how benefits of implementing and deploying the solutions identified addressing the shortfalls in the current environment are distributed across various user specified categories. The benefits may be measured by business metrics associated with cost, efficiency, productivity, etc. and translated into cash flow metrics such as NPV, IRR, ROI, and Payback time, or other finance metrics.

Once benefits are computed per year, they are amortized over the period of financial analysis automatically by the BCC tool as shown in FIG. 13. Once the costs and other client specific data are provided as input to the BCC tool, it automatically computes the key financials and presents an executive summary with charts. FIG. 14 shows the financial analysis result. Among the financial reported in the financial analysis, Net present value (NPV) is a standard method for the financial appraisal of long-term projects. It measures the excess or shortfall of cash flows, in present value (PV) terms, once financing charges are met. NPV is formally defined as present value of net cash flows when each cash inflow/outflow is discounted back to its PV:

$$NPV = \sum_{t=0}^{n} \frac{C_t}{(1+r)^t}$$

Where t is the time of the cash flow, n is the total time of the project, r is the discount rate, and $C_t$ is the net cash flow (the amount of cash) at time t. NPV is an indicator of how much value an investment or project adds to the value of the company. With a particular project, if $C_t$ is a positive value, the project is in the status of discounted cash inflow in the time of t. If $C_t$ is a negative value, the project is in the status of discounted cash outflow in the time of t. Generally speaking, companies will accept appropriately risked projects with a positive NPV.

Internal Rate of Return (IRR) is a finance metric used by businesses to decide whether they should make investments. It is an indicator of the efficiency of an investment (as opposed to NPV, which indicates value or magnitude). IRR is the annualized effective compounded return rate, which can be earned on the invested capital, i.e., the yield on the investment. A project is a good investment proposition if its IRR is greater than the rate of return that could be earned by alternative investments (investing in other projects, buying bonds, even putting the money in a bank account). Thus, IRR should be compared to an alternative cost of capital including an appropriate risk premium. In general, if IRR is greater than the project's cost of capital, or hurdle rate, the project will add value for the company.

Return On Investment (ROI) or Rate Of Return (ROR) is the ratio of money gained or lost on an investment relative to the amount of money invested. ROI is usually given as a percent rather than decimal value. ROI does not indicate how long an investment is held. However, ROI is most often stated as an annual or annualized rate of return, and it is most often stated for a calendar or fiscal year.

Payback period refers to the period of time required for the return on an investment to repay the sum of the original investment. It is intuitively the measure that describes how long something takes to pay for itself: shorter payback periods are obviously preferable to longer payback periods (all else being equal). Payback period is widely used due to its ease of use.

BT System Architecture

The BT tool or the system may be implemented as a pure spreadsheet-based application such as MS Excel-based application. In another embodiment, the BT tool may be implemented as a Web browser-based application. Yet in another embodiment, the BT tool may be implemented as a pure Eclipse Rich Client Platform (RCP) application. Still yet, the combinations of those applications may be used to implement the BT tool.

Microsoft™ (MS) Excel™ is an extensively used platform in the business practice. It is not only a data container, but also a powerful tool providing various capabilities for numerical analysis. It is also extensible via VBA (Visual Basic™ for Application) programming for customizing Excel™ behavior. Also, MS Excel™ uses MS COM technology, which enables a component-level access to Excel™ files. By using the component API of Excel™ and VBA™ programming, the users can respond to Excel™ events and manipulate Excel™ file content easily. Recent Excel™ releases support MS Net technology, which provides a programming environment to support MS Office™ extensions. The Net technology provides a rich set of user interface components and an object-oriented programming environment. However, the users must have a license of the Professional Edition of MS Office to run applications built on Net, which is often a constraint in a business environment. Without Net support, VBA™ programming in Excel™ does not support object-orientation and provides relatively poor routine function library support, which is a less appealing environment for building complex, modern business applications such as BT tool.

In another embodiment, BT tool may be built as a Web browser-based application, which is popular among modern business applications. With Web browser-based application, the users do not have to install any software to access the application. A Web browser and a network connection would suffice to run the BT tool in this architecture.

Yet in another embodiment, the BT tool may be implemented as Eclipse RCP™, which is relatively new. It is based on the Java technology, and provides a mature framework where plug-ins can be added to build complex, modern native desktop applications with by structurally stacking up programming building blocks or plug-ins. Developers can leverage third party products or rich sets of solutions from open source communities. Its plug-in architecture provides a powerful extension mechanism to extend and reuse previous efforts.

Business transformation method will now be explained with reference to an example of a financial institution and apply the methodology of the present disclosure systematically to identify opportunities for improvement and to evaluate the potential transformation projects and also with reference to FIG. 22, which shows a flow diagram of the business transformation methodology of the present disclosure in one embodiment.

At 180, data preparation is performed. The data preparation may begin with workshops and discussion with the operators and subject matter experts of the business. Some data is enterprise-specific such as as-is values, Application and Organization models. Some data is non-enterprise-specific. Those non-enterprise-specific data may be obtained from repositories, such as benchmark data, APQC PCF, CBM maps, and then may be customized for the analysis of the particular enterprise. Various models of finance functions of a company or entity being analyzed are prepared. These models may include a component business model of its business, the process model, the organizational model, a list or hierarchy of IT applications that help implement the business processes under investigation, and a list or hierarchy of metrics that help measure the processes and the activities under them.

At 182, all of these models are linked with one another, for instance, by the user using the Model Mapping Editor in the BT tool. For example, the organization that is responsible for implementing some or all aspects of a business process or activities is linked with the corresponding business processes or activities. Similarly, an IT application is linked with a business process that it implements. As explained earlier, in one embodiment, a hub-and-spoke approach is used to represent linking of models, i.e., all models are linked to the business process model instead of each model linking to each other model. This approach eliminates the need to specify elaborate linkages that can be cumbersome to specify and difficult to maintain (due to the potential conflicts that a user might introduce inadvertently). Once all the linkages are specified, the clients' data is gathered for the operational metrics. This data is used to compare the performance of the company or entity with its peers in the industry.

Figure 16:
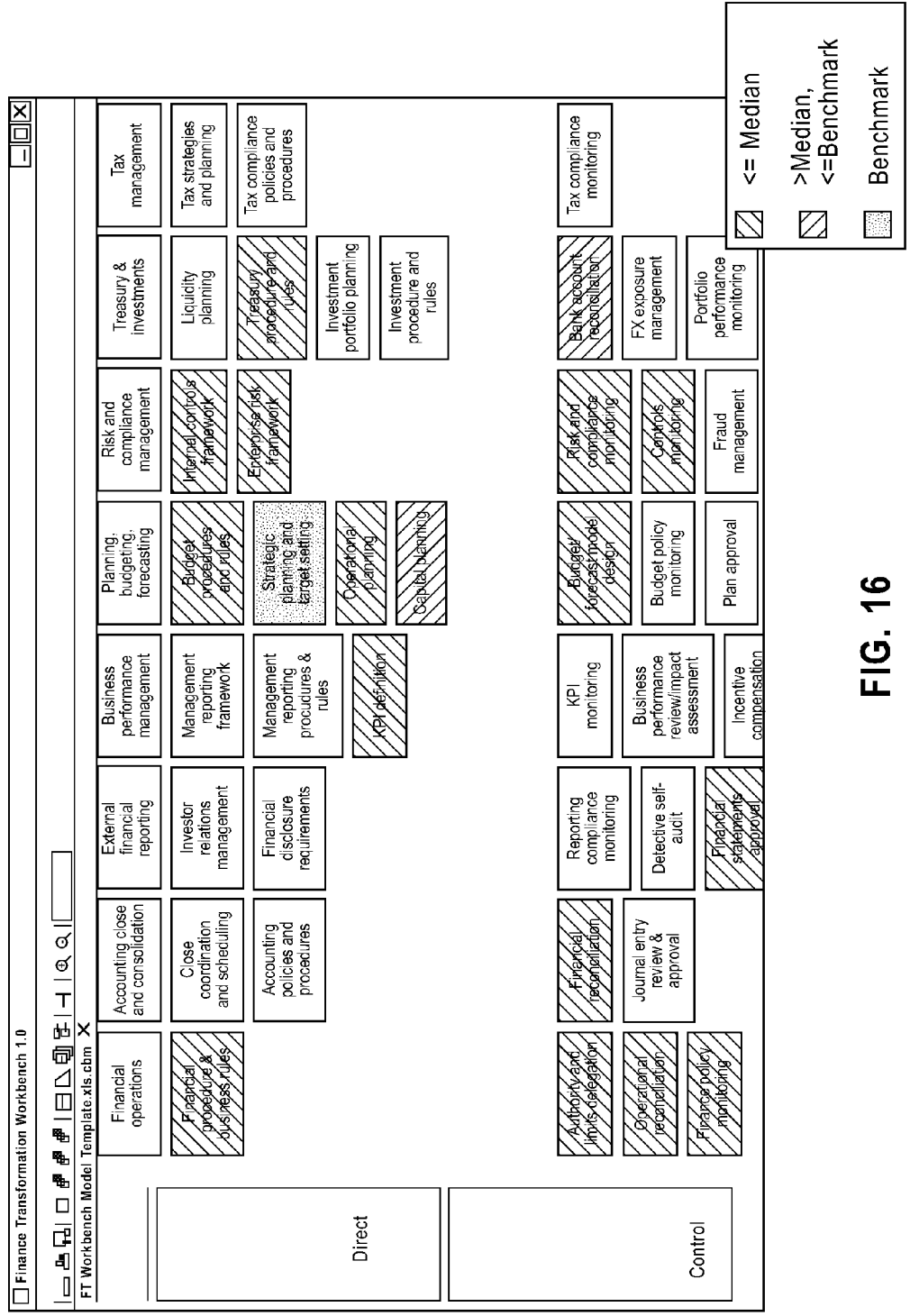
FIG. 16 illustrates an example of business component performance analysis results for an example company in one embodiment of the present disclosure.

At 184, business component performance analysis begins to analyze the company or entity's finance functions. A step in the analysis identifies areas of finance function at the company or entity that are underperforming. For this step, the operational metrics associated with the finance business processes are compared with the benchmark metrics (or client-set target levels) obtained by surveying other companies in similar industries. This collection of benchmark data may be obtained from past industry project or data available for use. The components whose metrics underperform in comparison to the industry benchmark values are highlighted in yellow. The components whose metrics underperform in comparison to the industry average values are highlighted in red. The components whose metrics perform above the industry benchmark values are highlighted in green. The heat map that may be generated is shown in FIG. 16. This business performance analysis indicated that the metrics associated with procure-to-pay function underperform by 30% in comparison with the industry's best and by 15% in comparison with industry's median.

Figure 17:
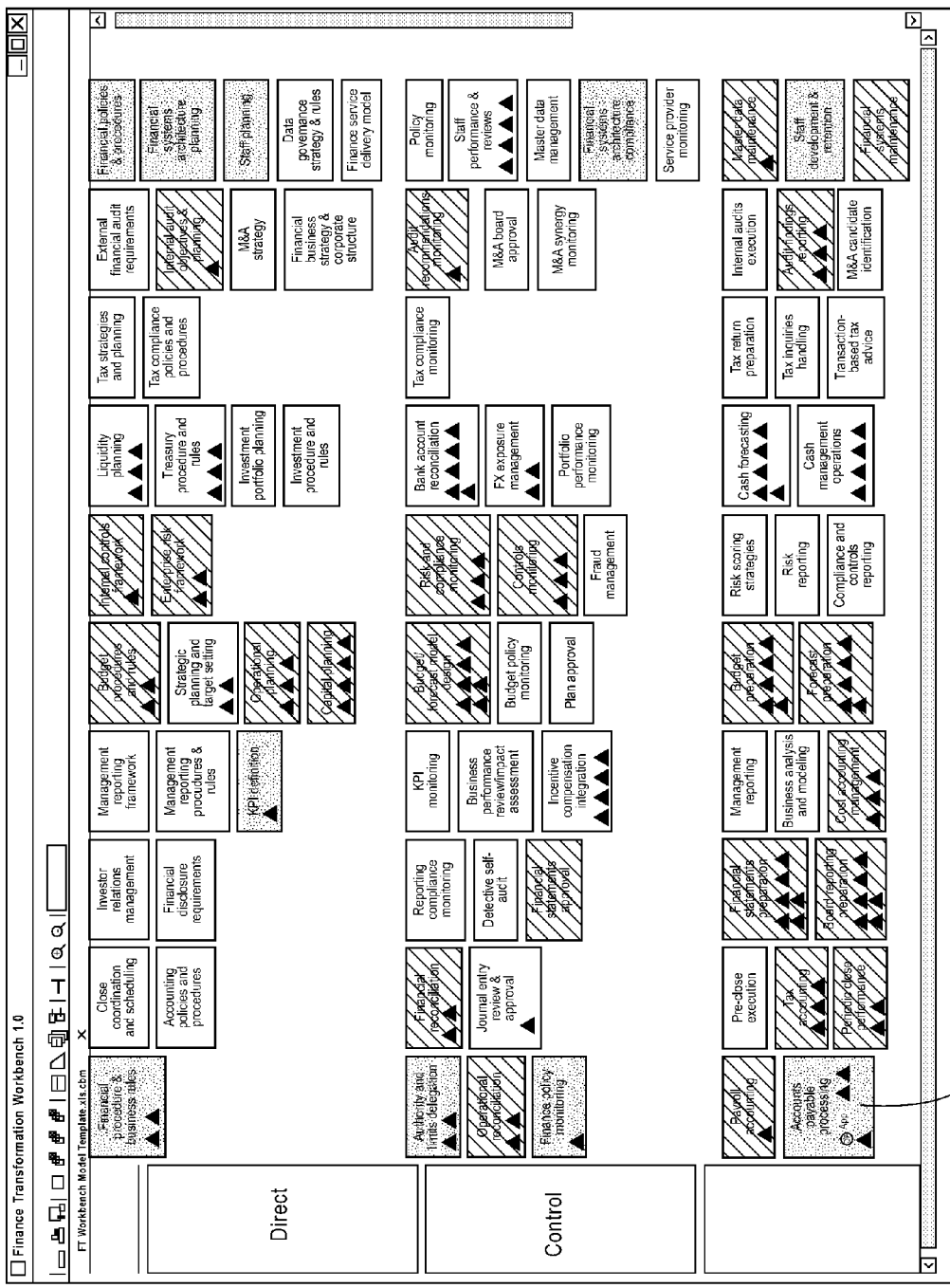
FIG. 17 illustrates landscape of IT applications overlaid on component business map.

At 186, application shortfall assessment is performed. For instance, the IT systems that implement the business processes associated with the underperforming business functional areas are examined in detail. This analysis is facilitated by an innovative visual overlay of information on business components. FIG. 17 shows such an IT application overlay. It shows which IT applications implement the business functions of which business components. For instance, as shown in FIG. 4, IT Applications are (e.g., manually) mapped 406 to Business Processes during the data preparation, and the mapping information is stored in the Model Template. Additionally, Business Components are (e.g., manually) mapped 402 to Business Processes 402, and the information is also stored in the Model Template. By using this explicit mapping information, the system and method of the present disclosure discover indirect, implicit relationships between IT Application elements and Business Components. The discovery becomes the result of the IT Application Shortfall Assessment query and it is visually rendered, e.g., as color-coded triangles (representing individual IT Applications) overlaid on top of associated Business Components. The triangles represent the IT applications. A mouse-over operation on each triangle in the Workbench provides details about the IT application. Three IT applications support the "Accounts Payable Processing" business component 1702 in this figure. Accounts Payable Process business component 1702 can be seen at the bottom left most part of FIG. 17. The three IT applications are: Oracle-AP, SAP-FI-AP, and TCS-Tally. The existence of multiple IT applications is possibly due to the duplicate systems accrued via mergers and acquistions. This fact highlights an opportunity for consolidation. The first step is to mark the Accounts Payable Processing component as containing "duplicate" IT applications. This is one of the types of "shortfalls" for this component. In the BT tool, this component is marked as a candidate for "duplicate" shortfall. The noted shortfall is shown as "Dapp" to denote application shortfall on the Accounts Payable Processing component.

Referring back to FIG. 22, at 188, organization shortfall analysis is performed. The organizations that implement the business components and processes under investigation are determined and analyzed. Determination of which organizations implement the business components and processes is made through the daisy-chain analysis explained above. A user may enter or map organizations to components and processes. Direct and indirect correlations or relationships are discovered automatically using the daisy-chain analysis. For example, the Organization Shortfall Assessment query applies the "Daisy-Chain Analyses." That is, an inference of indirect, implicit relationship between one or more Organizations and one or more Business Components, by using explicit, direction relationships 408 between Organizations and Business Processes and relationships 402 between Business Components and Business Processes are made. An inference engine of the present disclosure as part of the daisy-chain analysis may automatically infer the indirect relationships to overlay the Organizations on the associated Components.

Figure 18:
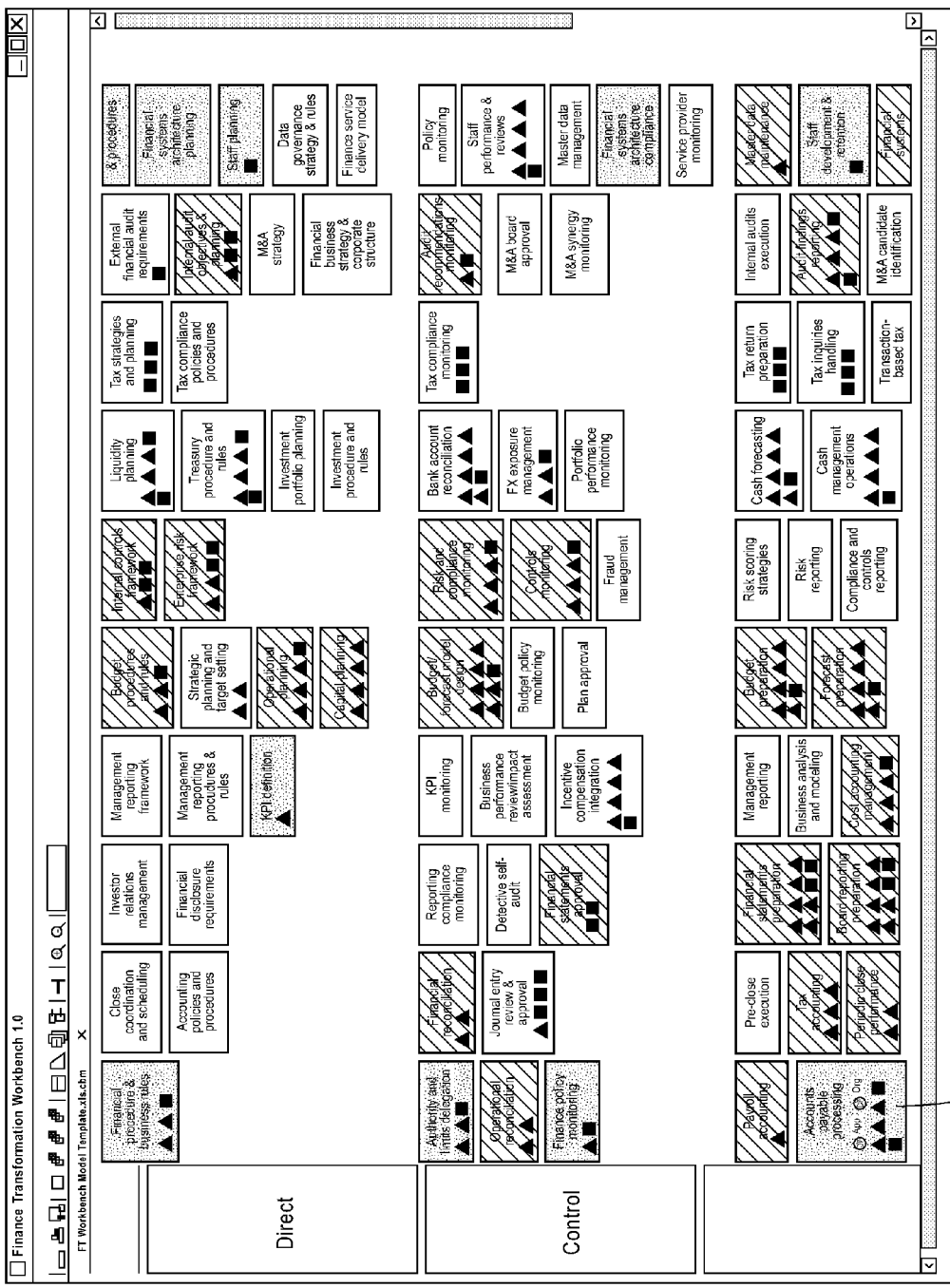
FIG. 18 illustrates landscape of organizations overlaid on the component business map.
Figure 24:
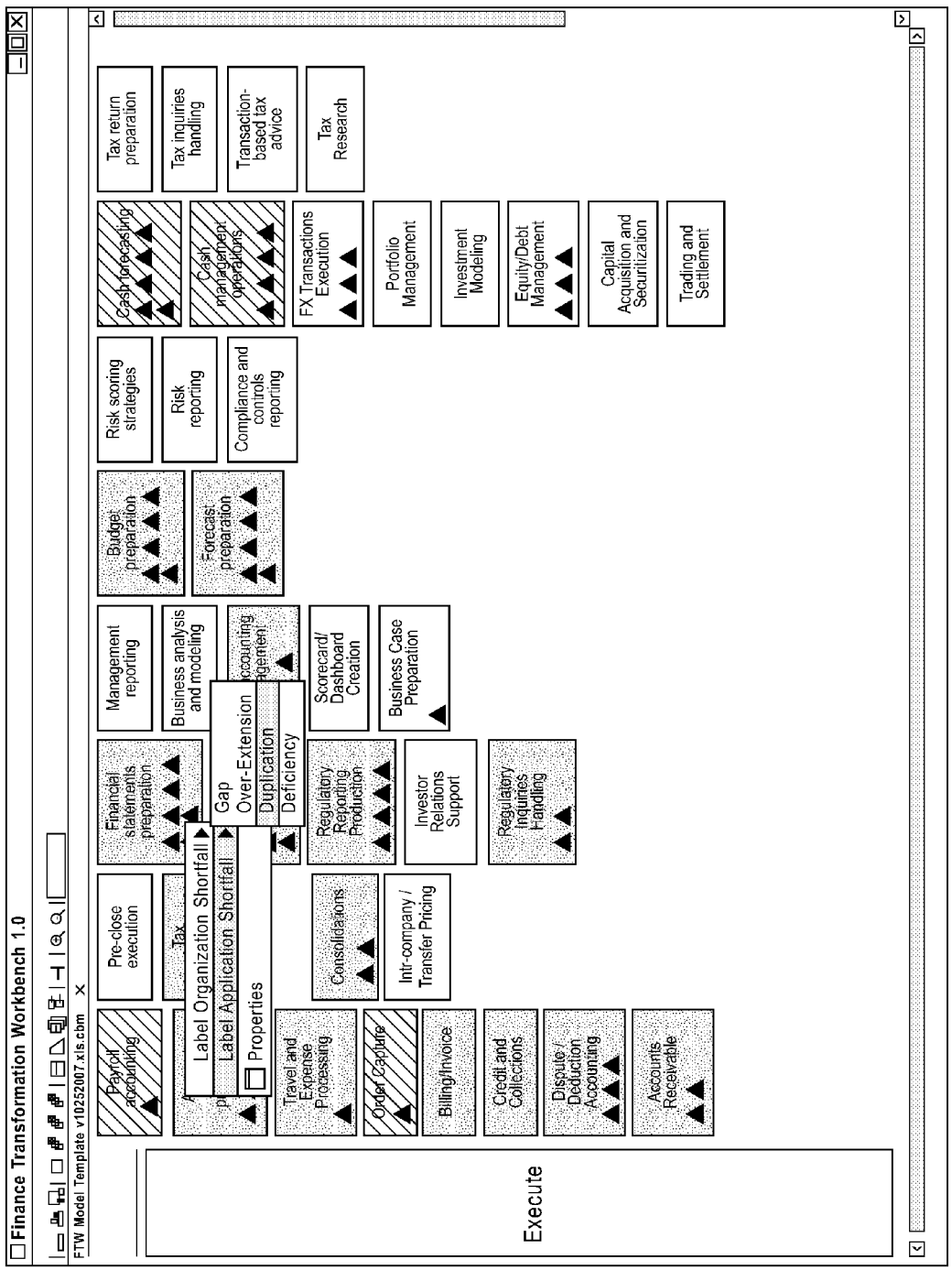
FIG. 24 shows an example of a user interface screen shot that allows for shortfall labeling.
Figure 27:
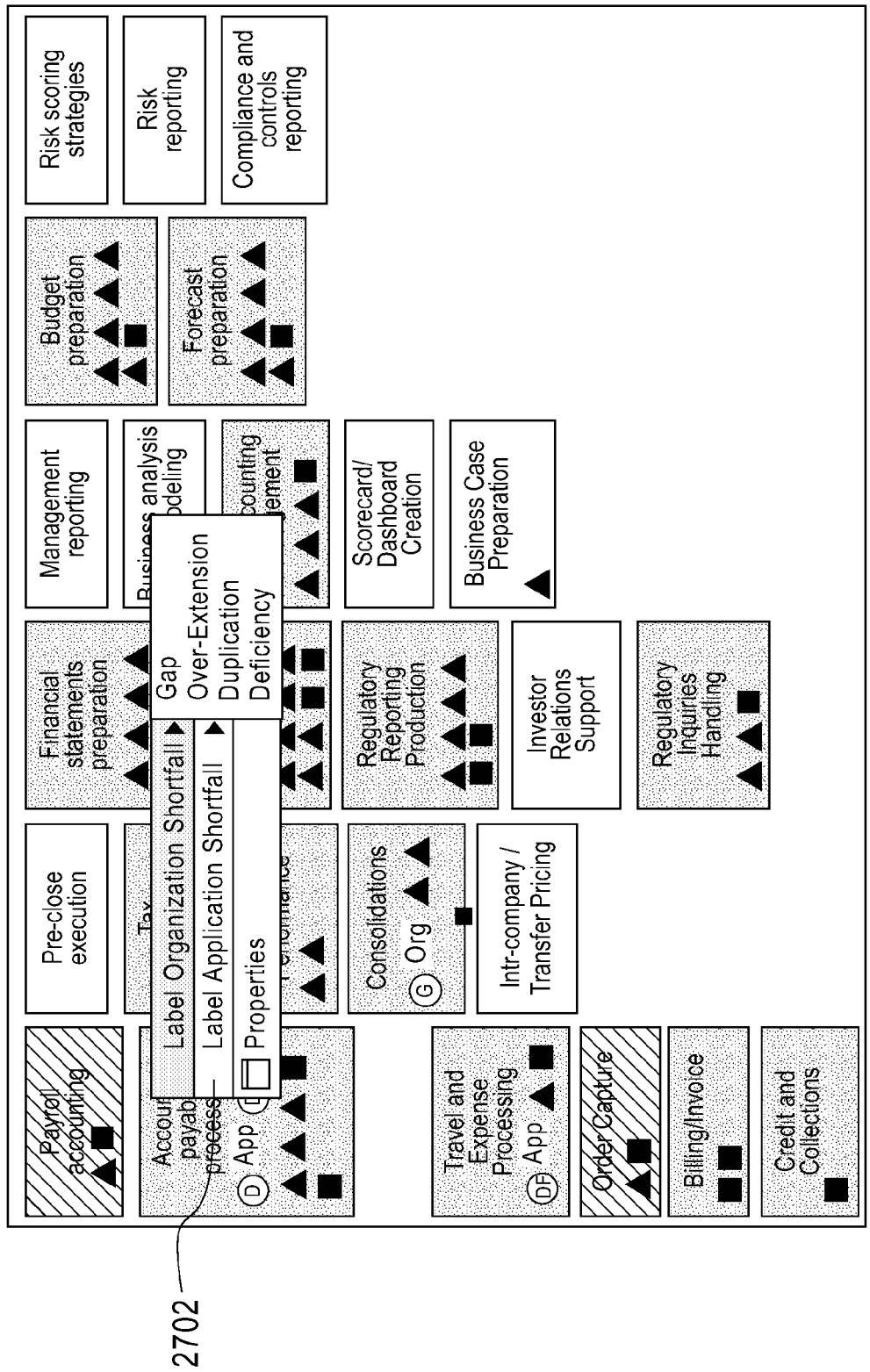
FIG. 27 shows an example of a user interface screen shot of organization labeling.

FIG. 18 shows which organizations implement the business functions of which business components. The squares represent the organizations. A mouse-over operation on each square in the BT tool provides details about the organization. It can be noted on FIG. 18 that two organizations are involved in "Accounts Payable Processing" component 1802: Accounts and Regional Audit. Although this finding by itself does not mean that two organizations cannot perform the business functions associated with "Accounts Payable Processing", it raises a flag. Perhaps there is a better way where a single organization is responsible for managing the accounts payables. If the user desires, the user may add a note to investigate this finding further by marking the "Accounts Payable Processing" component as a potential candidate for organization duplication shortfall. The organization duplication shortfall is noted as "[D]org" in FIG. 18. In one embodiment, the BT Tool provides a user interface for the labeling operation, as shown in FIG. 27. The labeling of the IT Application Shortfall may work in the same way as shown in FIG. 24. The user right-clicks on a Business Component shown in the view of the BT Tool. A window of the user interface for the shortfall labeling 2702 pops up. The user selects either IT Application or Organization Shortfall by using a pointing device such as a computer mouse. Then, the user selects a shortfall type, gap, deficiency, duplication and over-extension, for Application or Organization by using the pointing device. The BT Tool puts a visual label selected on the Component, for example, [D]org indicating a duplication of organizations.

As summary, the following observations are noted of company or entity's business performance after conducting the qualitative analysis shown at steps 182, 184, 186 and 188:

Business component performance analysis indicated that the metrics associated with procure-to-pay function underperform by 30% in comparison with the industry's best and by 15% in comparison with industry's median.

IT application analysis indicated that three different IT systems are used to perform the "Accounts Payable" function.

Organizational analysis indicated that two different organizations across the company perform the "Accounts Payable" function.

Figure 22:
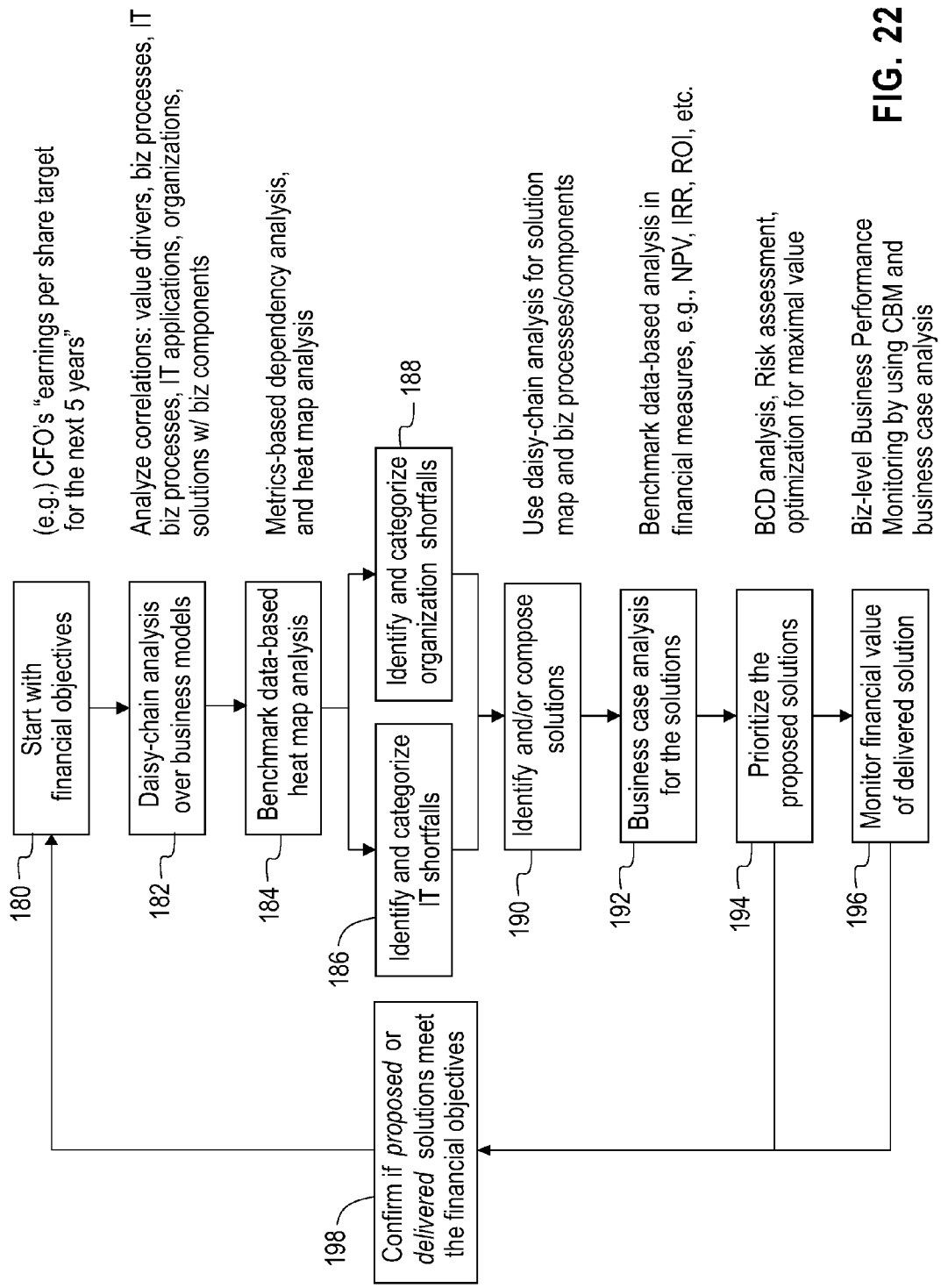
FIG. 22 is a flow diagram illustrating a method of the present disclosure in one embodiment.

Referring to FIG. 22, given the above analysis and summary, solution analysis is performed at 190. Choice of solutions depends on a number of factors: breadth of the pain points, the benefits offered by a solution, company's budget constraints, duration within which improved results are expected, etc. As an example, the "Redesign Procure-to-Pay Process" solution is determined to address the application as well as organizational shortfalls. Therefore, the user chooses the "Redesign Procure2Pay Process" solution as a potential candidate solution for improving the procure-to-pay process of the company or entity.

Figure 19:
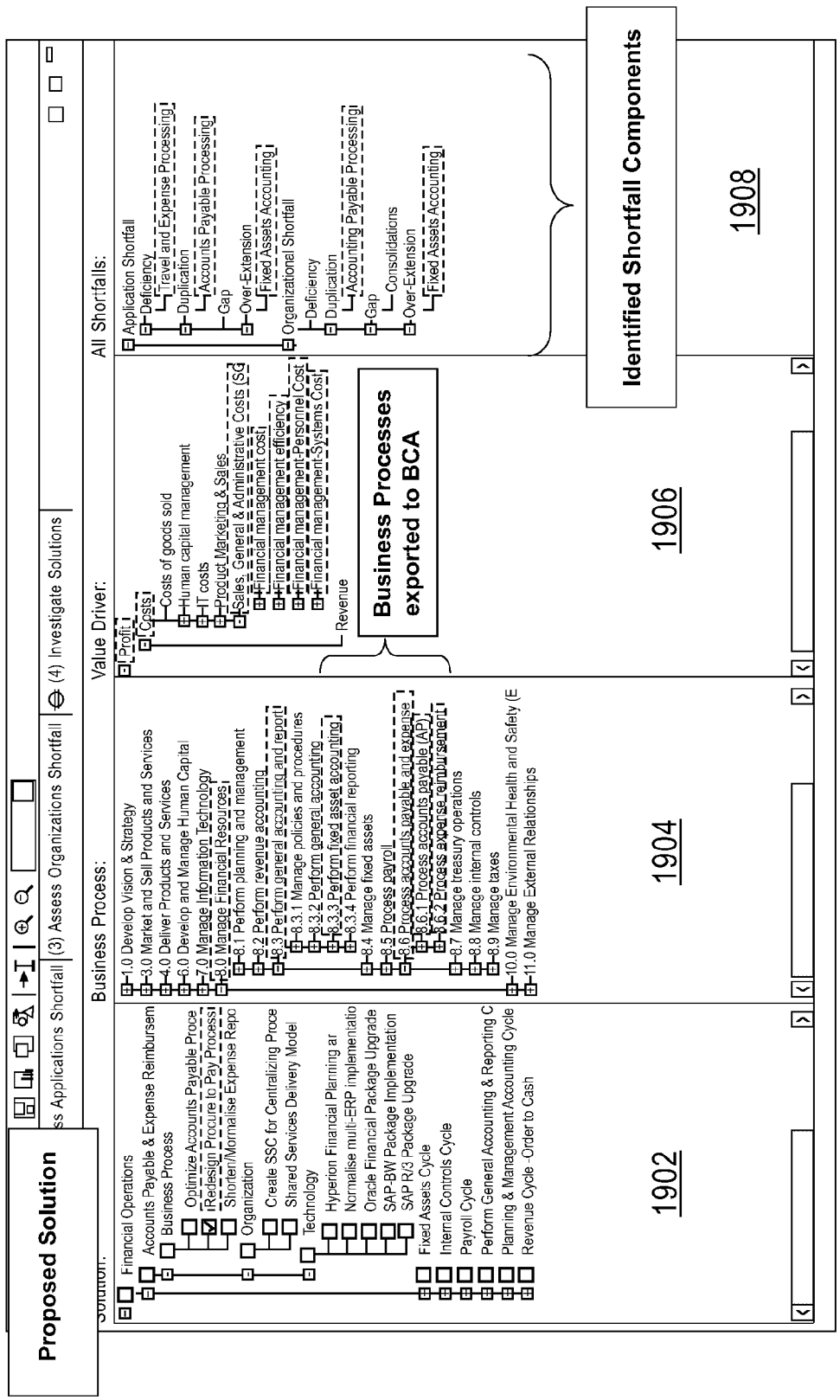
FIG. 19 illustrates an example of a user interface screen shot for performing solution analysis.

FIG. 19 shows the model linkages, which lead to the selection of the solution. Selecting a proposed solution or a set of proposed solutions 1902 in the BT tool shows the linkages of that solution with process 1904, metrics 1906 and shortfalls 1908. These linkages help the user to understand (a) which processes the selected solution impacts (b) which metrics can be used to measure the impact of process improvements to be achievable by implementing the chosen solution, and (c) which of the marked shortfalls the chosen solution address.

The solution analysis indicated helps the user get a quick idea at a qualitative level about which solutions can help address the shortfalls. Referring to FIG. 22, at 192, potential benefits the company may get by implementing the chosen solution(s) are analyzed. This business case analysis may be started, for example, by selecting or clicking the 'Compute Business Value' button in the BT tool. The Business Case Analysis performed at 192, for instance, may include business case calculation using the Business Case Calculator (BCC) tool of the BT tool. As an example, computation of financial benefits of implementing the "Redesign Procure-to-Pay" business solution is described. As explained earlier, the Procure-to-Pay business includes three business processes: accounts payable processing, fixed asset accounting, and travel and expense reimbursements processing. These processes are passed down to BCC for benefit computations. The BCC tool automatically configures itself to capture the preliminary benefits for these processes. This configuration may be accomplished by making an assumption that, if the company's performance metrics are below the benchmark, then implementing the industry best-practice solution for the company would improve the metrics to the benchmark values. Therefore, the difference between the as-is values for the client metrics for each of these processes and the benchmark values gives the expected cost savings. In the case of the company or entity, it chose to represent additional cost savings it would obtain by outsourcing the procure-to-pay function via better spend management. Spend management means that the company is able to make use of the discounts offered to its customers when the bills are paid on or before time. This additional benefit is also taken into the overall cost reductions. The costs that would be incurred by the company to implement this solution are also modeled A view of the cost modeling is shown in FIG. 20.

The result of the Net Present Value (NPV) analysis is shown below in FIG. 21. The results indicate that the project will yield significant cost reductions. The return on investment (ROI) is projected as over 200%.

Referring back to FIG. 22, at step 194, the proposed solutions may be prioritized. When there is a plurality of solutions identified addressing shortfalls in the current business environment, the challenge for the business owner is to create a roadmap, which shows a proper order, i.e., priority of implementation and deployment of selected solutions to have the business to the target environment in a most efficient and cost-effective way. In an embodiment, this challenge can be met by running the Business Case Analysis 192 multiple times, separately for different sets of solutions, to understand the cost-benefit of each of the solution groups. Then the cost-benefit information of the different solutions groups can be used to prioritize the selected solutions in the portfolio. In this process, the business owner perhaps put a high priority on solutions, which will have more impact on the business. However, the business owner may take into account other factors such as available budget and resource, etc.

At step 196, financial value of delivered solution may be monitored. Once one or more of the selected solutions are implemented and deployed to the business environment, the business owner may want to confirm if those solutions deliver the benefit that was estimated during the business case analysis. This step may be part of a business performance monitoring. In one aspect, the metrics structure that was built for the business case analysis in the system and method of the present disclosure can be reused for calculating high-level financial benefits in the business performance monitoring environment. At step 198, it is confirmed whether the proposed or delivered solutions meet the financial objects. In case the monitored business performance does not match with the estimated performance provided by the business case analysis 192, the business owner may want to investigate the causes for the discrepancy. This investigation may utilize the BT Tool for the next round of analysis.

In the following description, an example walk-through of financial transformation of the present disclosure is illustrated with accompanying figures. Referring to FIG. 7, when a user selects a component, for example, by clicking a component (e.g., green color coded), all processes (e.g., red color coded) and value drivers (e.g., purple color coded) associated with the selected component are highlighted. The highlighting occurs as a result of daisy-chain correlation of the network of models that were mapped previously, either by defaults automatically or manually by a user, or combinations thereof.

Figure 23:
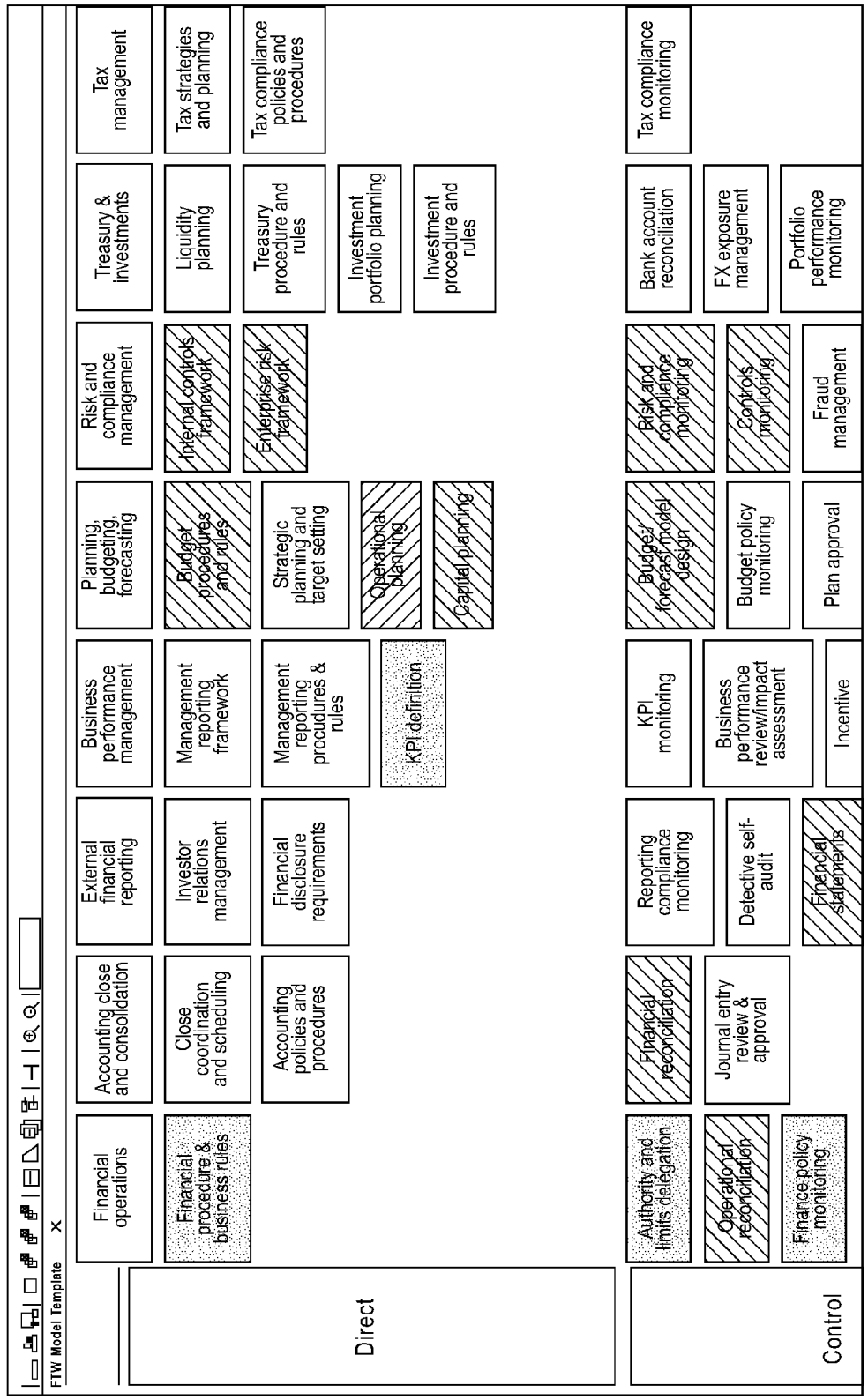
FIG. 23 shows an example of a user interface screen shot for performing component performance analysis in which value drivers are selected.

FIG. 23 shows a user interface screen shot of performing component performance analysis in which value drivers are selected.

FIG. 23 shows an example of a heat map analysis for identifying "hot" components whose performance is lagging behind benchmark value, e.g., best practice peers in the industry. The components colored red may indicate that their performance is not even as good as the median values. The components colored yellow may indicate that the performance is better than the median but worse than the benchmark. The components with green may indicate that the performance is better than the benchmark. The operation is a visual query to identify "hot" components by comparing the as-is value against the benchmark values.

Referring to FIG. 24, application overlay is performed. This is another visual query to visually identify and categorize shortfalls in terms of IT. Each colored triangle overlaid on top of component represents an IT application the enterprise has deployed. Color-coding may distinguish applications, e.g., triangles with the same color represents the same application. Once overlaid on components, the user of the BT tool can visually identify and categorize shortfalls of the current IT environment, e.g., gap, deficiency, duplication, and over-extension, as shown in FIG. 25.

FIG. 24 also shows a user interface that allows for shortfall labeling for labeling the IT shortfalls to components. Once the user selects a shortfall type from the window, a label indicating the selected shortfall type appears on the component.

Figure 25:
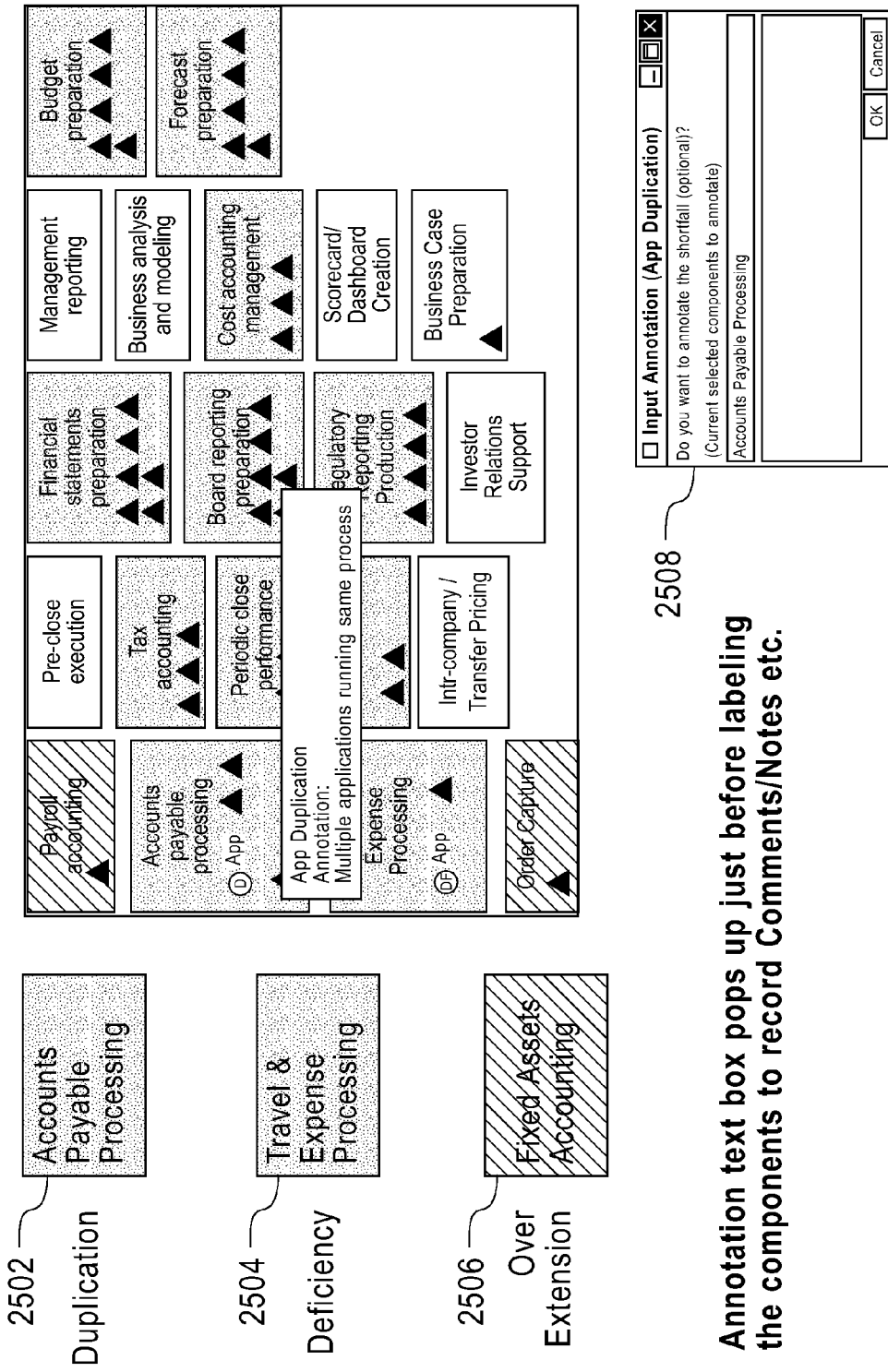
FIG. 25 illustrates shortfall analysis in one embodiment of the present disclosure.

FIG. 25 illustrates shortfall analysis. In this analysis, potential shortfalls in IT system capabilities are identified and categorized. Examples of shortfalls uncovered may include duplication of efforts or processes as shown at 2502, deficiency in areas 2504, and over extension. Gap indicates that a component is "hot" (red from the heat map analysis) but there is no IT application (those triangles overlaid) supporting the component. Deficiency 2504 indicates that a hot component has one or more application supporting it, but its performance is still not enough (red), so it needs strengthening of the IT application. Duplication 2502 indicates that a component has more than one applications supporting it. One may want to consolidate them to reduce the overhead cost in maintenance and communication. Over-extension 2506 is a case where an IT application supports more than one components. Ideally, an application supports only one component and works independently of other components. One may want to refocus the application to only one component. An annotation text box may pop up on the user interface screen to record comment or notes or like.

Figure 26:
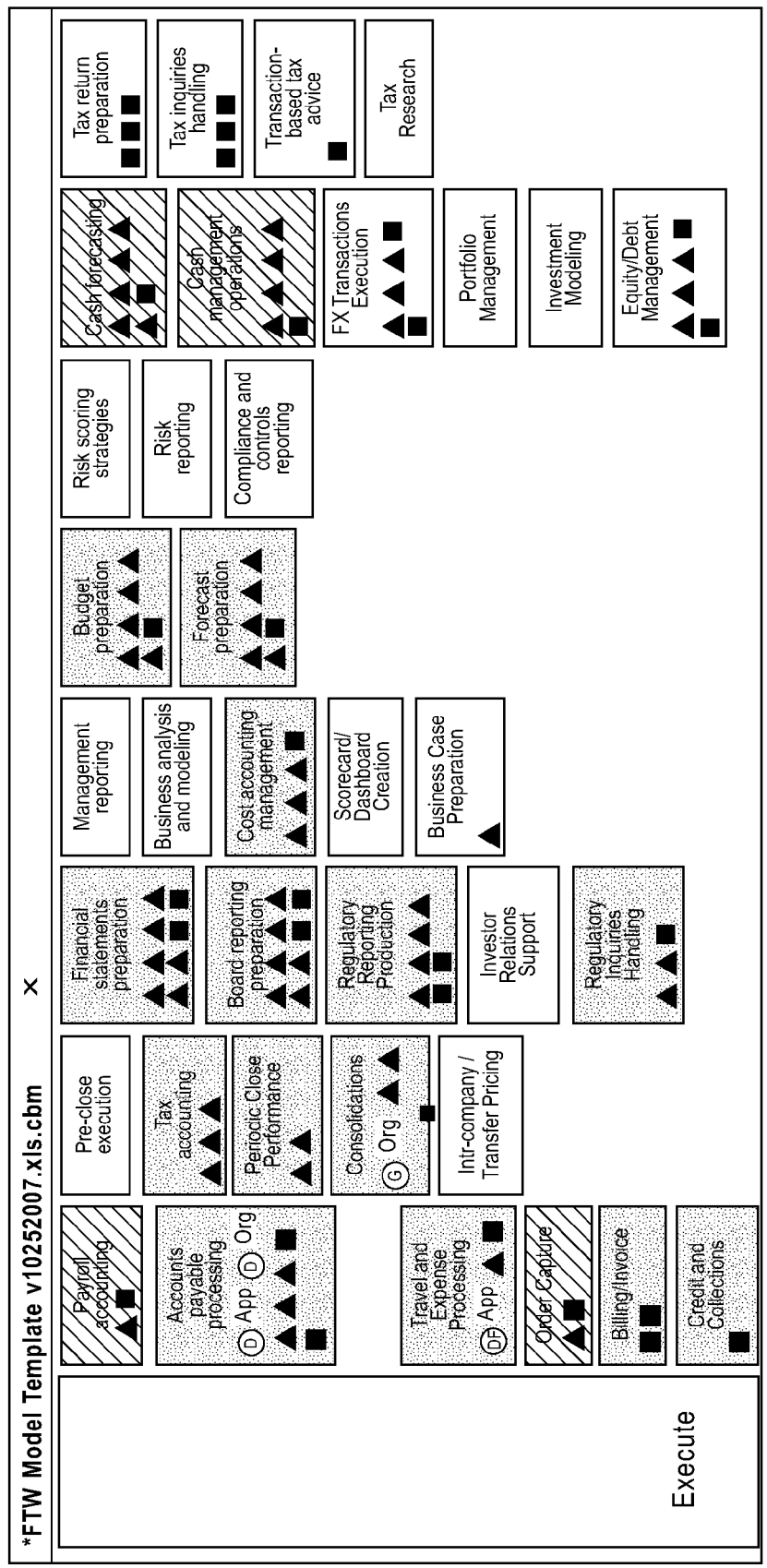
FIG. 26 shows an example of a user interface screen shot of organization overlay.

FIG. 26 shows a user interface screen shot of organization overlay. Additional to the shortfall assessment of application represented by colored triangles, this figure shows another visual query to visually identify and categorize shortfalls in terms of organization. Each colored square overlaid on top of component represents a department the enterprise has deployed. Color-coding may distinguish departments, e.g., squares with the same color represent the same department. Once overlaid on components, the user of the BT tool can visually identify and categorize shortfalls of the current organization environment—gap, deficiency, duplication, and over-extension, as shown in FIG. 28.

FIG. 27 shows a user interface screen shot of organization labeling. This figure shows a GUI graphical user interface operation for labeling the organizational shortfalls to components. Once the user selects a shortfall type from the window, a label indicating the selected shortfall type appears on the component.

Figure 28:
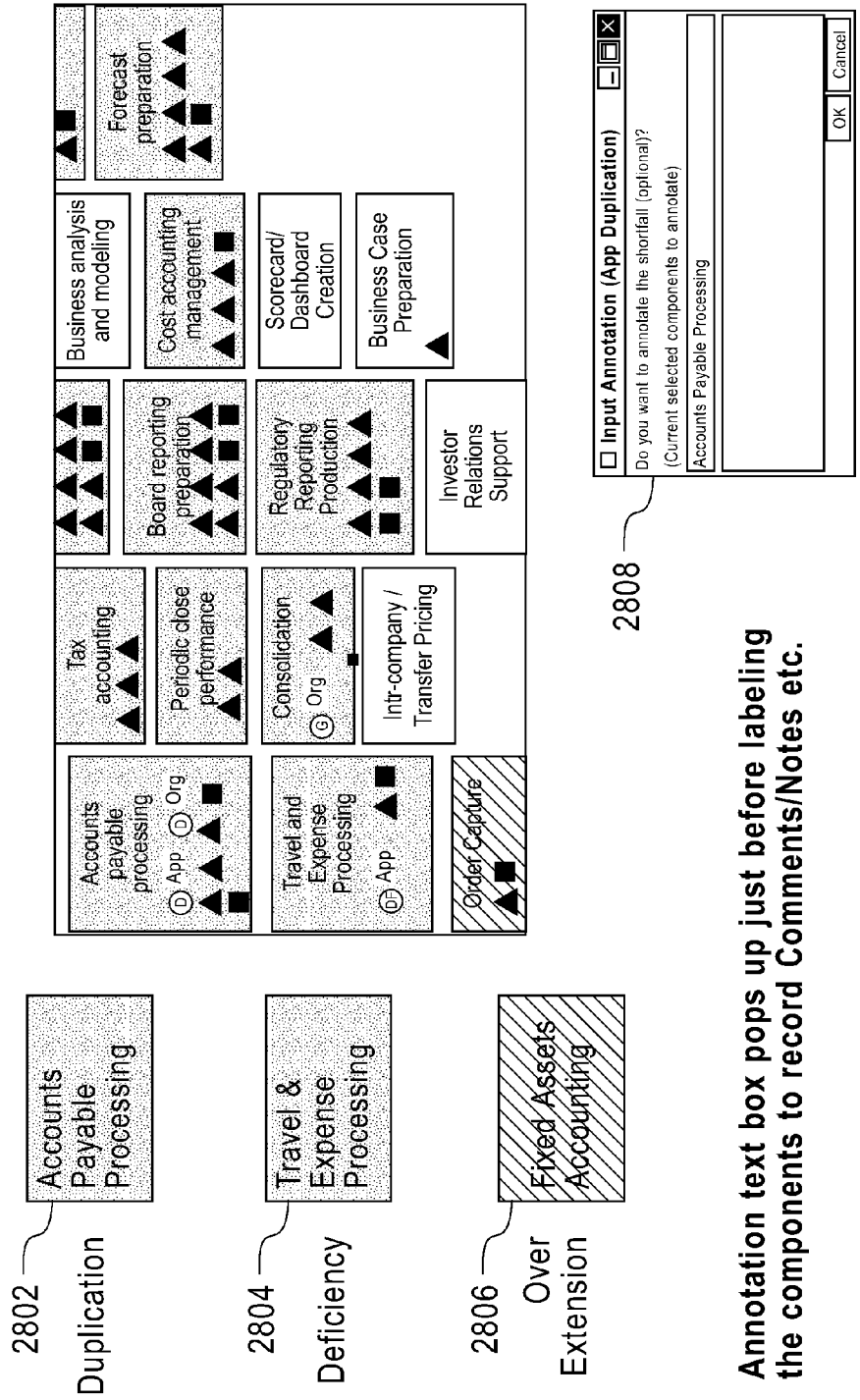
FIG. 28 illustrates an example of a user interface screen shot for identifying and categorizing organization shortfalls.

FIG. 28 illustrates a user interface screen shot for identifying and categorizing organization shortfalls. For example, duplication 2802, gaps 2804 and over extension 2806 present in the organization are identified, e.g., automated by using pattern recognition algorithms. The users of the tool may manually identify and categorize organization shortfalls helped by the tool's visual cues. Gap 2804 indicates that a component is "hot" (red from the heat map analysis) but there is no department (those square overlaid) supporting the component. Deficiency indicates that a hot component has one or more departments supporting it, but its performance is still not enough (red), so the department needs strengthening. Duplication 2802 indicates that a component has more than one department supporting it. One may want to consolidate them to reduce the overhead cost in maintenance and communication. Over-extension 2806 is a case where a department supports more than one component. Ideally, a department supports only one component and works independently of other components. One may want to refocus the department to only one component. An annotation box 2808 may be provided that pops up automatically for entering comments or notes or like.

Figure 29:
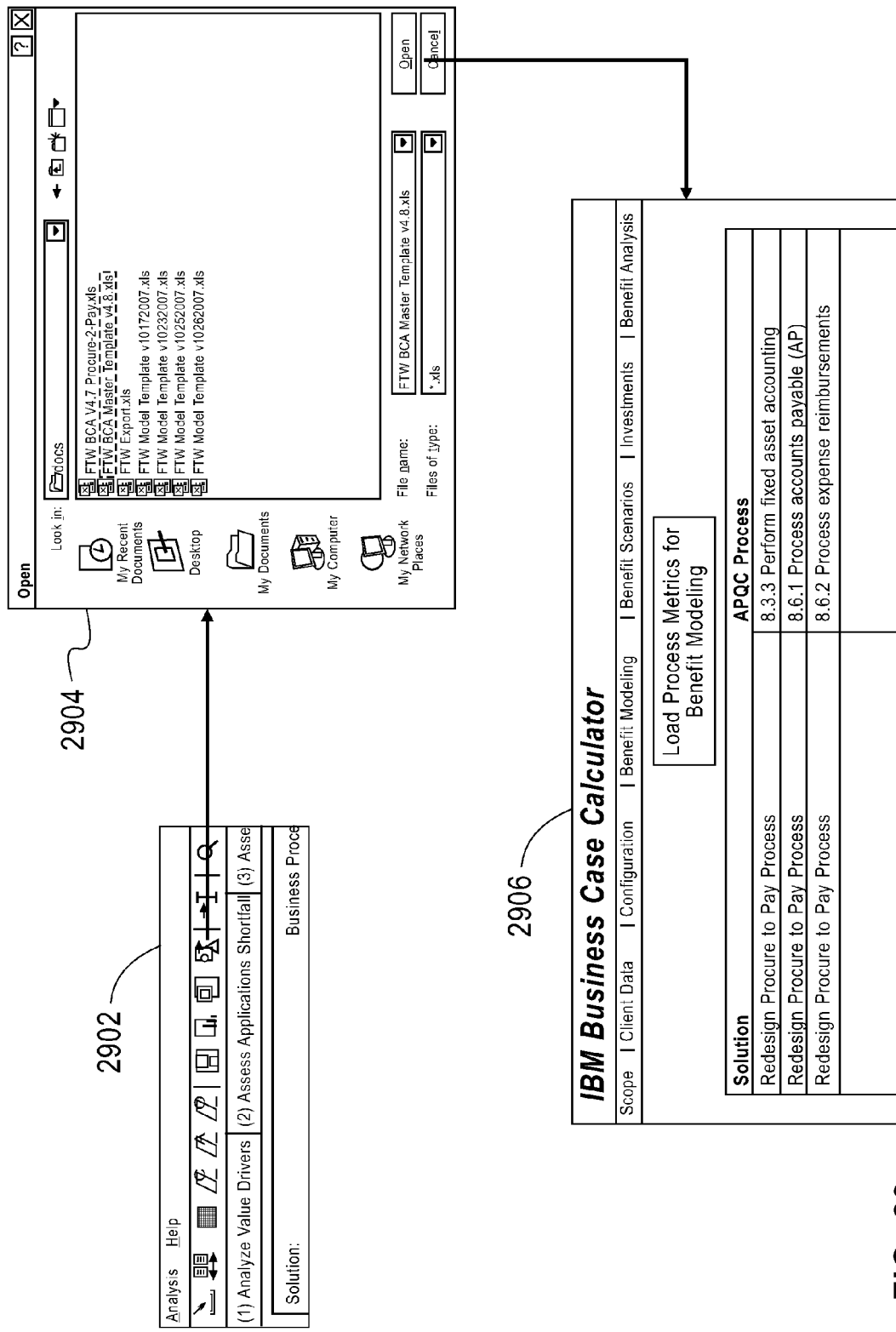
FIG. 29 illustrates an example of a user interface screen shots allowing exporting of selected solutions to business case calculator.

FIG. 29 illustrates user interface screen shots allowing exporting of selected solutions to business case calculator. Once the user selects one or more solutions that will address the identified shortfalls, the user may select or click the "Export" button in the tool 2902. The system shows the hard drive explorer window where the user can select the Business Case Calculator from the drive 2904. When the user selects the BCC tool, it opens with the selected solutions in it exported from the BT tool 2906.

Figure 30:
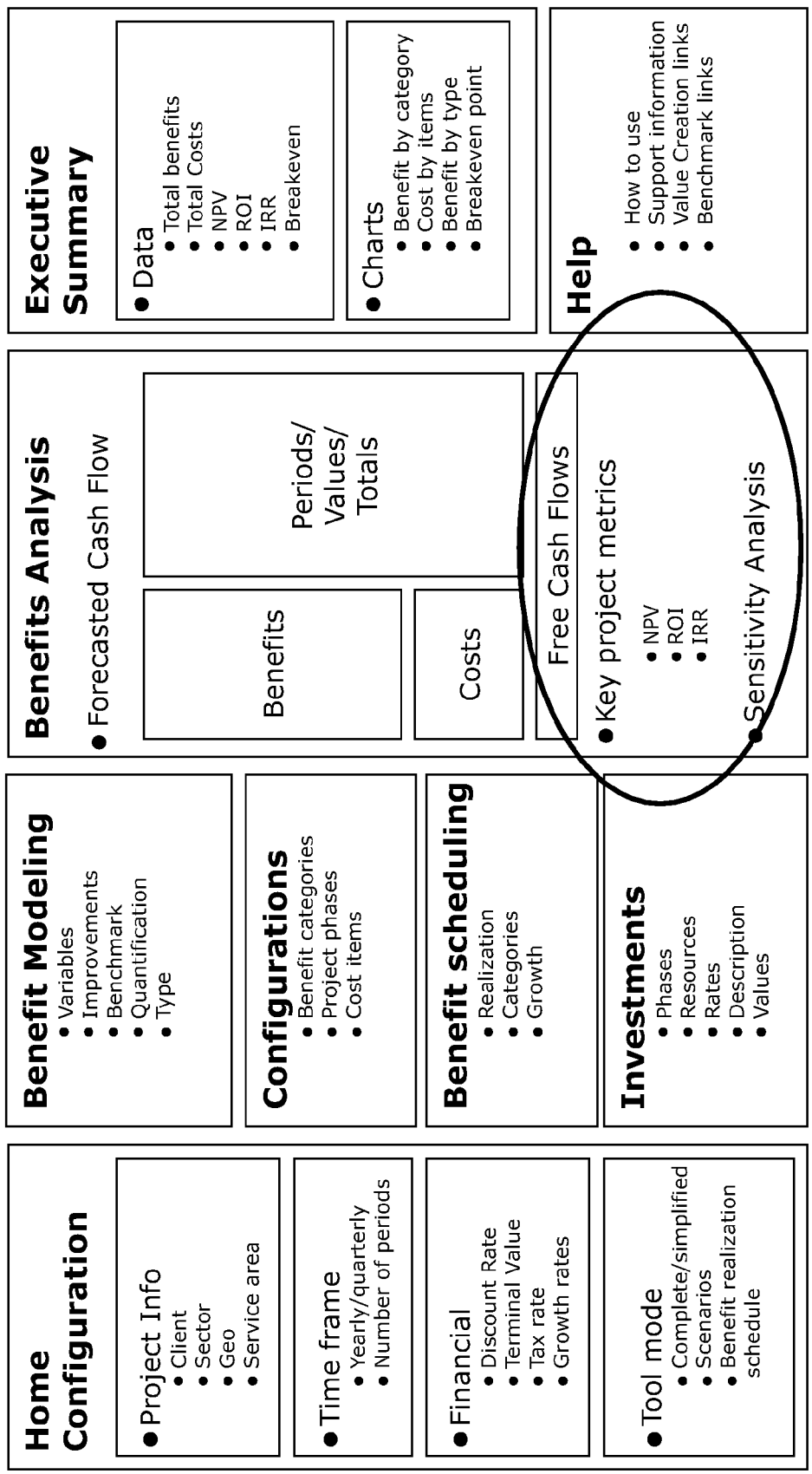
FIG. 30 illustrates an example of a business case analysis tool overview of the present disclosure in one embodiment.

In FIG. 30 illustrates a business case analysis tool of the present disclosure in one embodiment. This figure shows an overview of the BCC tool comprising four functional components or sections—Home configuration 3002, Benefit Modeling 3004, Benefit Analysis 3006 and Executive Summary 3008. Home configuration 3002 provides the user with the place where the user can input basic information of the analysis, set parameter values for basic assumptions of the analysis. Benefit Modeling 3004 is the place where the user configures the schedule of the project of implementing the selected solutions, identifies and configures benefits and costs of the project, again by using the benchmark values. Benefit Analysis 3006 is the place where the cash flow of the project is calculated and the benefits of the project is indicated by using financial terms such as NPV, ROI, IRR, and payback time. Executive Summary 3008 provides the summary in tables and charts.

Various aspects of the present disclosure may be embodied as a program software or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer implemented method for providing a graphical user interface to perform financial transformation, comprising:
   establishing a hub and spoke network of models including at least a process model as the hub and at least components model, value drivers model, applications model, solutions models as the spoke connected to the process model,
   the establishing including providing a mapping editor allowing a user to select a source model and a target model via the graphical user interface on a display device that presents a plurality of nodes under the source model in a tree view and a plurality of nodes under the target model in a tree view, the target model being the business process model, wherein the user is enabled to map one or more of the plurality of nodes under the source model and one or more nodes of the plurality of nodes under the target model by selecting one or more leaf nodes of the plurality of nodes under the source model and one or more of the plurality of nodes under the target model on the graphical user interface;
   inferring, by a processor, a plurality of correlations among said models using daisy-chain analysis that navigates the hub and spoke network of models;
   generating heat map and performing analysis on the heat map;
   performing application short fall analysis, the shortfall analysis including at least selecting application, overlaying application, and identifying application shortfall;
   performing organization shortfall analysis, the organization shortfall analysis including at least selecting organization unit, overlaying organization unit, and identifying organization shortfall;
   performing solution analysis, the solution analysis including at least reviewing shortfall, selecting solution and analyzing solution; and
   performing business case analysis, the business case analysis including at least a combination of CBM analysis and benchmarking data-based business case analysis with financial metrics.

2. The method of claim 1, wherein the financial metrics include at least NPV, IRR and ROI.

3. The method of claim 1, wherein the step of establishing includes:
   providing a template for each of said models;
   allowing a user to create said models using the templates.

4. The method of claim 3, wherein the step of establishing further includes:
   populating said template for each of the models with default data associated with a selected enterprise.

5. The method of claim 4, wherein the default data includes historical data associated with financial information, organizational information of the selected enterprise and computer applications used in the selected enterprise.

6. The method of claim 1, further including identifying business transformation initiatives and assessing one or more benefits of the business transformation initiatives base on the steps of performing.

7. The method of claim 6, wherein the identifying the business transformation initiatives includes analyzing an entity's one or more of operational metrics, IT applications, organizational structure, and business processes hierarchy.

8. The method of claim 7, wherein one or more of the business transformation initiatives are automatically identified and suggested for a selected pain point and business objectives including financial targets, the pain point and the business objectives being an area where the entity is identified as underperforming in comparison to its peers, similarly industry, or one or more expectations set by the entity, or combinations thereof.

9. The method of claim 8, wherein said one or more benefits of business transformation initiatives are assessed based on impact on improvements to process, IT landscape, and organizational structure as measured by one or more metrics.

10. The method of claim 9, wherein the improvements to process, IT landscape, organizational structure improvements are assessed by comparing as-is values of corresponding metrics of the entity with best practice metrics as gathered from interviews of said peers, similarly industry, or one or more expectations set by the entity, or combinations thereof.

11. The method of claim 10, further including storing the improvements for a selected entity and the benchmarked data-based business case analysis to enable automation of benefits calculation.

12. The method of claim 11, wherein the benefits calculation includes costs and investments apart from the benefits obtained via process, IT landscape, and organizational enhancements.

13. The method of claim 12, wherein the costs and investments used for implementing the transformation initiatives are user-provided, pre-computed based on historical and empirical data, or combinations thereof.

14. The method of claim 13, wherein benefits calculation includes computing financial metrics.

15. The method of claim 14, wherein the financial metrics include at least one of Net Present Value, Internal Rate of Return, Return on Investment, break-even analysis, or combinations thereof.

16. The method of claim 15, further including using the benefits calculation to refine the business transformation initiatives to optimize an investment portfolio of the entity.

17. A computer implemented method for providing a graphical user interface to perform financial transformation, comprising:
   establishing a hub and spoke network of models including at least a process model as the hub and at least components model, value drivers model, applications model, solutions models as the spoke connected to the process model;
   providing a model mapper editor to allow mapping of a plurality of components of said models, the mapping editor allowing a user to select a source model and a target model via the graphical user interface on a display device that presents a plurality of nodes under the source model in a tree view and a plurality of nodes under the target model in a tree view, the target model being the business process model, wherein the user is enabled to map one or more of the plurality of nodes under the source model and one or more nodes of the plurality of nodes under the target model by selecting one or more leaf nodes of the plurality of nodes under the source model and one or more of the plurality of nodes under the target model on the graphical user interface;
   providing a computer-implemented module executing on a processor and that infers a plurality of correlations among said models, using daisy-chain analysis that navigates the hub and spoke network of models;
   providing a computer-implemented module that generates heat map and perform analysis on the heat map;
   providing a computer-implemented module that performs application short fall analysis, the shortfall analysis including at least selecting application, overlaying application, and identifying application shortfall;
   providing a computer-implemented module that performs organization shortfall analysis, the organization shortfall analysis including at least selecting organization unit, overlaying organization unit, and identifying organization shortfall;
   providing a computer-implemented module that performs solution analysis, the solution analysis including at least reviewing shortfall, selecting solution and analyzing solution; and
   providing a computer-implemented module that performs business case analysis, the business case analysis including at least a combination of CBM analysis and benchmarking data-based business case analysis with financial metrics.

18. The method of claim 17, wherein the financial metrics include at least NPV, IRR and ROI.

19. The method of claim 17, wherein the step of establishing includes:
   providing a template for each of said models;
   allowing a user to create said models using the templates.

20. The method of claim 19, wherein the template for each of the models is operable to be populated with default data associated with a selected enterprise.

21. The method of claim 20, wherein the default data includes historical data associated with financial information, organizational information of the selected enterprise and computer applications used in the selected enterprise.

22. The method of claim 17, further including providing a computer-implemented module that identifies business transformation initiatives and assess one or more benefits of the business transformation initiatives base on the steps of performing.

23. The method of claim 17, further including providing a computer-implemented module that enables automation of benefits calculation.

24. The method of claim 23, wherein the benefits calculation includes costs and investments apart from the benefits obtained via process, IT landscape, and organizational enhancements.

25. The method of claim 24, further including providing a computer-implemented module that refines the business transformation initiatives to optimize an investment portfolio of the entity using the benefits calculation.

26. A non-transitory program storage device readable by a machine, tangibly embodying a program of instructions executable by the machine to perform a method of providing a graphical user interface to perform financial transformation, comprising:
   establishing a hub and spoke network of models including at least a process model as the hub and at least components model, value drivers model, applications model, solutions models as the spoke connected to the process model, the establishing including providing a mapping editor allowing a user to select a source model and a target model via the graphical user interface on a display device that presents a plurality of nodes under the source model in a tree view and a plurality of nodes under the target model in a tree view, the target model being the business process model, wherein the user is enabled to map one or more of the plurality of nodes under the source model and one or more nodes of the plurality of nodes under the target model by selecting one or more leaf nodes of the plurality of nodes under the source model and one or more of the plurality of nodes under the target model on the graphical user interface;

inferring a plurality of correlations among said models using daisy-chain analysis that navigates the hub and spoke network of models;

generating heat map and performing analysis on the heat map;

performing application short fall analysis, the shortfall analysis including at least selecting application, overlaying application, and identifying application shortfall;

performing organization shortfall analysis, the organization shortfall analysis including at least selecting organization unit, overlaying organization unit, and identifying organization shortfall;

performing solution analysis, the solution analysis including at least reviewing shortfall, selecting solution and analyzing solution; and performing business case analysis, the business case analysis including at least a combination of CBM analysis and benchmarking data-based business case analysis with financial metrics.

27. A non-transitory program storage device readable by a machine, tangibly embodying a program of instructions executable by the machine to perform a method of providing a graphical user interface to perform financial transformation, comprising:

establishing a hub and spoke network of models including at least a process model as the hub and at least components model, value drivers model, applications model, solutions models as the spoke connected to the process model;

providing a model mapper editor to allow mapping of a plurality of components of said models, the model mapper editor allowing a user to select a source model and a target model via the graphical user interface on a display device that presents a plurality of nodes under the source model in a tree view and a plurality of nodes under the target model in a tree view, the target model being the business process model, wherein the user is enabled to map one or more of the plurality of nodes under the source model and one or more nodes of the plurality of nodes under the target model by selecting one or more leaf nodes of the plurality of nodes under the source model and one or more of the plurality of nodes under the target model on the graphical user interface;

providing a computer-implemented module that infers a plurality of correlations among said models using daisy-chain analysis that navigates the hub and spoke network of models;

providing a computer-implemented module that generates heat map and perform analysis on the heat map;

providing a computer-implemented module that performs application short fall analysis, the shortfall analysis including at least selecting application, overlaying application, and identifying application shortfall;

providing a computer-implemented module that performs organization shortfall analysis, the organization shortfall analysis including at least selecting organization unit, overlaying organization unit, and identifying organization shortfall;

providing a computer-implemented module that performs solution analysis, the solution analysis including at least reviewing shortfall, selecting solution and analyzing solution; and providing a computer-implemented module that performs business case analysis, the business case analysis including at least a combination of CBM analysis and benchmarking data-based business case analysis with financial metrics.

28. A system for providing a graphical user interface to perform financial transformation, comprising:

one or more processors;

a module that establishes a hub and spoke network of models including at least a process model as the hub and at least components model, value drivers model, applications model, solutions models as the spoke connected to the process model;

a model mapper editor to allow mapping of a plurality of components of said models, the model mapper editor allowing a user to select a source model and a target model via the graphical user interface on a display device that presents a plurality of nodes under the source model in a tree view and a plurality of nodes under the target model in a tree view, the target model being the business process model, wherein the user is enabled to map one or more of the plurality of nodes under the source model and one or more nodes of the plurality of nodes under the target model by selecting one or more leaf nodes of the plurality of nodes under the source model and one or more of the plurality of nodes under the target model on the graphical user interface;

a module executing on the one or more processor and that infers a plurality of correlations among said models using daisy-chain analysis that navigates the hub and spoke network of models;

a module that generates heat map and perform analysis on the heat map;

a module that performs application short fall analysis, the shortfall analysis including at least selecting application, overlaying application, and identifying application shortfall;

a module that performs organization shortfall analysis, the organization shortfall analysis including at least selecting organization unit, overlaying organization unit, and identifying organization shortfall;

a module that performs solution analysis, the solution analysis including at least reviewing shortfall, selecting solution and analyzing solution; and a module that performs business case analysis, the business case analysis including at least a combination of CBM analysis and benchmarking data-based business case analysis with financial metrics.

29. The system of claim 28, further including a module that identifies business transformation initiatives and assesses one or more benefits of the business transformation initiatives base on the steps of performing.

30. The system of claim 29, further including a module that enables automation of benefits calculation.

31. The system of claim 30, wherein the benefits calculation includes costs and investments apart from the benefits obtained via process, IT landscape, and organizational enhancements.

32. The system of claim 31, further including a module that refines the business transformation initiatives to optimize an investment portfolio of the entity using the benefits calculation.

* * * * *